United States Patent [19]

Tanioka

[11] Patent Number: 5,270,808
[45] Date of Patent: Dec. 14, 1993

[54] COLOR IMAGE PROCESSING WITH ADJUSTMENT OF COMPUTED RECORDING COLOR TO MATCH ORIGINAL COLOR

[75] Inventor: Hiroshi Tanioka, Yokohama, Japan

[73] Assignee: Canon Kabushiki Kaisha, Tokyo, Japan

[21] Appl. No.: 24,869

[22] Filed: Mar. 1, 1993

Related U.S. Application Data

[63] Continuation of Ser. No. 945,577, Sep. 16, 1992, abandoned, which is a continuation of Ser. No. 739,992, Aug. 2, 1991, abandoned.

[30] Foreign Application Priority Data

| Aug. 3, 1990 | [JP] | Japan | 2-206602 |
| Aug. 3, 1990 | [JP] | Japan | 2-206604 |
| Aug. 3, 1990 | [JP] | Japan | 2-206605 |
| May 20, 1991 | [JP] | Japan | 3-114302 |

[51] Int. Cl.$^5$ .......................... H04N 1/46; G03F 3/08
[52] U.S. Cl. .................................. 358/527; 358/500
[58] Field of Search ............................... 358/75-80

[56] References Cited

U.S. PATENT DOCUMENTS

| 4,672,432 | 6/1987 | Sakurada et al. | 358/75 |
| 4,745,465 | 5/1988 | Kwon | 358/80 |
| 4,794,382 | 12/1988 | Lai et al. | 358/80 |
| 4,884,130 | 11/1989 | Huntsman | 358/75 |
| 4,907,076 | 3/1990 | Ohsawa | 358/80 |
| 4,924,301 | 5/1990 | Surbrook | 358/75 |
| 4,926,251 | 5/1990 | Sekizawa et al. | 358/80 |
| 4,972,257 | 11/1990 | Birnbaum et al. | 358/80 |
| 4,992,864 | 2/1991 | Akiyama | 358/80 |
| 5,008,742 | 4/1991 | Shigaki et al. | 358/80 |

FOREIGN PATENT DOCUMENTS 3415778 10/1984 Fed. Rep. of Germany.
3636658 4/1987 Fed. Rep. of Germany.

*Primary Examiner*—Stephen Brinich
*Attorney, Agent, or Firm*—Fitzpatrick, Cella, Harper & Scinto

[57] ABSTRACT

There is disclosed a color image processing method and apparatus therefor, in which the input image data are converted into a color coordinate system represented by luminosity and hue, for example L*a*b* space. The colors reproducible on the output device, for example a printer, are also converted into this coordinate system. An average value is calculated over plural pixels in the vicinity of an object pixel to be digitized, and plural average values are then obtained by including the object pixel selected at each of the reproducible colors. The input image signal is digitized to the closest one of the plural average signals. The digitization error generated upon digitization is distributed to the succeeding pixels with weighted ratios. This method achieves faithful color reproduction, matching the colors reproducible on the recording or display device.

27 Claims, 21 Drawing Sheets

FIG. 4

| x | L$_x^*$ | a$_x^*$ | b$_x^*$ |
|---|---|---|---|
| C | 60 | -20 | -40 |
| M | 50 | 70 | -20 |
| Y | 90 | -20 | 80 |
| R | 50 | 50 | 30 |
| G | 50 | -60 | 20 |
| B | 30 | 30 | -40 |
| K | 25 | 5 | -5 |
| W | 90 | 0 | 0 |

FIG. 5

| D | C | B |
|---|---|---|
| A | * |   |

*OBJECTIVE PIXEL POSITION

FIG. 6

| 1 | 3 | 1 |
|---|---|---|
| 3 | 8 |   |

| 620 / RECORD SIGNAL | C | M | Y | K |
|---|---|---|---|---|
| C | 1 | 0 | 0 | 0 |
| M | 0 | 1 | 0 | 0 |
| Y | 0 | 0 | 1 | 0 |
| K | 0 | 0 | 0 | 1 |
| R | 0 | 1 | 1 | 0 |
| G | 1 | 0 | 1 | 0 |
| B | 1 | 1 | 0 | 0 |
| W | 0 | 0 | 0 | 0 |

FIG. 7B

| 620 / REPRESENTATION COLOR | R | G | B |
|---|---|---|---|
| C | 0 | 1 | 1 |
| M | 1 | 0 | 1 |
| Y | 1 | 1 | 0 |
| K | 0 | 0 | 0 |
| R | 1 | 0 | 0 |
| G | 0 | 1 | 0 |
| B | 0 | 0 | 1 |
| W | 1 | 1 | 1 |

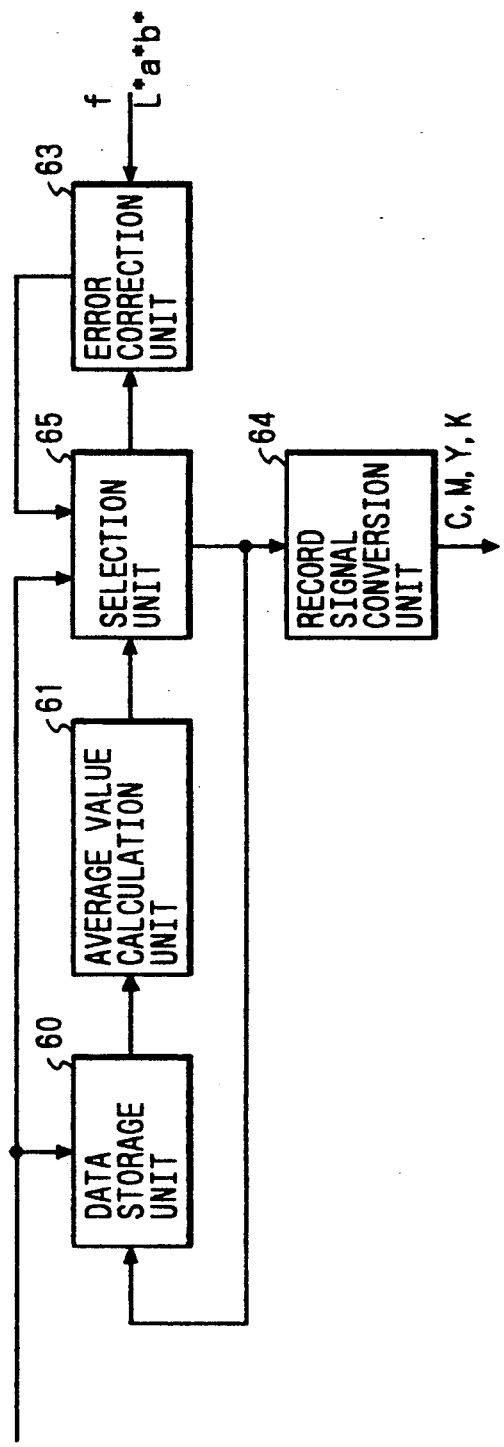

FIG. 13

| REQUANTIZATION SIGNAL x | REPRESENTATION COLOR | RECORD COLOR | | | |
|---|---|---|---|---|---|
| | | Cx | Mx | Yx | Kx |
| 0 | C | 1 | 0 | 0 | 0 |
| 1 | M | 0 | 1 | 0 | 0 |
| 2 | Y | 0 | 0 | 1 | 0 |
| 3 | K | 0 | 0 | 0 | 1 |
| 4 | R | 0 | 1 | 1 | 0 |
| 5 | G | 1 | 0 | 1 | 0 |
| 6 | B | 1 | 1 | 0 | 0 |
| 7 | W | 0 | 0 | 0 | 0 |

FIG. 14

| REQUANTIZATION SIGNAL x | REPRESENTATION COLOR | CONVERSION DATA | | |
|---|---|---|---|---|
| | | $L_x^*$ | $a_x^*$ | $b_x^*$ |
| 0 | C | 60 | -20 | -40 |
| 1 | M | 50 | 70 | -20 |
| 2 | Y | 90 | -20 | 80 |
| 3 | K | 25 | 3 | -3 |
| 4 | R | 50 | 50 | 30 |
| 5 | G | 50 | -60 | 20 |
| 6 | B | 30 | 30 | -40 |
| 7 | W | 95 | 0 | 0 |

FIG. 15
```
| * | e1 |
| e2 |
```
*OBJECTIVE PIXEL POSITION
FIG. 16
FIG. 17
 × (1/35)   × (1/16)   × (1/16)

FIG. 20

| REQUANTIZATION SIGNAL x | REPRESENTATION COLOR | CONVERSION DATA | | |
|---|---|---|---|---|
| | | $Xx^{1/3}$ | $Yx^{1/3}$ | $Zx^{1/3}$ |
| 0 | C | 150 | 160 | 210 |
| 1 | M | 180 | 150 | 170 |
| 2 | Y | 220 | 230 | 120 |
| 3 | K | 80 | 80 | 80 |
| 4 | R | 170 | 140 | 100 |
| 5 | G | 120 | 150 | 120 |
| 6 | B | 120 | 100 | 160 |
| 7 | W | 150 | 250 | 250 |

FIG. 21

| 1 | 4 | 1 |
|---|---|---|
| 4 | 6 | |

×1/16

WEIGHTING COEFFICIENT

FIG. 24

|  | cmy | CMYK |
|---|---|---|
| CYAN | 100 | 1000 |
| YELLOW | 001 | 0010 |
| MAGENTA | 010 | 0100 |
| GREEN | 101 | 1010 |
| BLUE | 110 | 1100 |
| RED | 011 | 0110 |
| WHITE | 000 | 0000 |
| BLACK | 111 | 0001 |

FIG. 26

|  | CYAN | MAGENTA | YELLOW |
|---|---|---|---|
| CYAN | 206 | 91 | 37 |
| YELLOW | 19 | 16 | 196 |
| MAGENTA | 55 | 220 | 77 |
| GREEN | 210 | 92 | 176 |
| BLUE | 183 | 219 | 100 |
| RED | 60 | 200 | 190 |
| WHITE | 15 | 15 | 15 |
| BLACK | 210 | 220 | 210 |

FIG. 27

|  |  | CYAN | MAGENTA | YELLOW |
|---|---|---|---|---|
| A | CYAN | 206 | 91 | 37 |
| B | WHITE | 15 | 15 | 15 |
| C | YELLOW | 19 | 16 | 196 |
| D | WHITE | 15 | 15 | 15 |

FIG. 28

| OBJECTIVE PIXEL PREDICTION | Mc | Mm | My |
|---|---|---|---|
| CYAN | 135 | 63 | 119 |
| YELLOW | 65 | 35 | 179 |
| MAGENTA | 79 | 112 | 134 |
| GREEN | 137 | 64 | 171 |
| BLUE | 127 | 111 | 143 |
| RED | 81 | 104 | 176 |
| WHITE | 64 | 35 | 111 |
| BLACK | 137 | 112 | 184 |

|      | C | M | Y | K |
|------|---|---|---|---|
| K    | 0 | 0 | 0 | 1 |
| Kc   | 1 | 0 | 0 | 1 |
| Km   | 0 | 1 | 0 | 1 |
| Ky   | 0 | 0 | 1 | 1 |
| Kcmy | 1 | 1 | 1 | 0 |

COLOR IMAGE PROCESSING WITH ADJUSTMENT OF COMPUTED RECORDING COLOR TO MATCH ORIGINAL COLOR

This application is a continuation of application Ser. No. 07/945,577, filed Sep. 16, 1992, now abandoned, which is a continuation of application Ser. No. 07/739,992, filed Aug. 2, 1992 now abandoned.

BACKGROUND OF THE INVENTION

1. Field of the Invention

The present invention relates to an image processing method for receiving a color image in the form of digital signals and effecting a pseudo-halftone processing to display said signals or convert said signals into recording signals.

2. Related Background Art

In a color image processing apparatus such as a digital color copying machine, a pseudo-halftone processing has been conducted on the image data, obtained by reading an original image, for image display or image recording. For such pseudo halftone processing there are already known, for example, the dither method and the error diffusion (ED) method.

For reproducing a color image with these methods, for example with a light emitting display such as a cathode ray tube, the input multi-value data of red, green and blue color components are subjected to pseudo-halftone processing independently in the color spaces of red, green and blue. Also, in the case of using a thermal recording apparatus such as a thermal transfer printer, an ink jet recording apparatus or an electrostatic recording apparatus, the input multi-value data are generally transformed from the R, G, B-color coordinate system to the C, M, Y (K)-color coordinate system and are subjected to independent pseudo halftone processing in respective color spaces as explained above.

However the pseudo halftone processing of density preserving type, such as the error diffusion method, is basically designed to conserve the density in a microspace in each color space, so that the color synthesized from the results of independent processings in three or four color spaces does not necessarily coincide with the color of the original image. Stated differenly, each point on the recording sheet does not necessarily have exactly the color of that point of the original input image. Particularly small black dots resulting from black color generation in human skin color areas give rise to an unnatural texture, thus resulting in the deterioration of the image quality.

Also, in the case of image production with an apparatus utilizing the RGB color space and that utilizing the CMYK color space, there is required a color coordinate converting circuit from the RGB color space to the CMYK color space, or vice versa.

Furthermore, in the case of variation in the recording characteristics of a binary recording apparatus, the correction of so-called masking or undercolor removal coefficients requires an enormous amount of data processing which cannot be achieved inexpensively in a practical apparatus. Also, the compression of redigitized data after pseudo-halftone processing can only be effected independently in each of four colors.

SUMMARY OF THE INVENTION

An object of the present invention is to provide a color image processing method not associated with the drawbacks of the above-explained conventional methods, and to provide an apparatus therefor.

Another object of the present invention is to provide a novel color image processing method for direction conversion from data in a color space represented by hue and luminosity into a color for representation or recording, and an apparatus therefor.

Still another object of the present invention is to provide a color image processing method capable of reproducing hues faithful to the input color image by pseudo-halftone processing of input image data in a color space represented by luminosity and hue, and also of providing an image of increased quality by correcting errors generated at the conversion to the color of representation, and an apparatus therefor.

The foregoing objects can be attained, according to the present invention, by a color image processing apparatus provided with first input means for entering a color image in the form of color coordinate data represented by luminosity and hue; second input means for entering representation colors of N kinds used for recording or display, in the form of the above-mentioned color coordinate data; process means for converting the color coordinate data entered by said first input means into one of the representation colors of N kinds; and means for correcting the error generated in said conversion process.

Also according to the present invention there are provided means for determining the average value in the color space represented by luminosity and hue based on the already digitized data in the vicinity of an object pixel and the anticipated digitized value of the object pixel; means for determining the difference $\Delta E$ between said anticipated average value and the input image signal; digitizing means for selecting a digitized value providing the smallest of several such differences as the digitized value of the object pixel; and conversion means for converting the thus-digitized signal into a signal for recording or display.

Still another object of the present invention is to provide a color image processing method capable of more faithful re-digitization of the input color image and of correcting variation in the recording characteristics, and an apparatus therefor.

Still another object of the present invention is to provide a color image processing method enabling faithful color representation regardless whether the output device is a display or a recording device, thereby facilitating system construction, and an apparatus therefor.

Still another object of the present invention is to provide a color image processing method capable of preventing image blur at an edge portion by an adaptive correction of he error generated at the digitization, and an apparatus therefor.

The foregoing and still other objects of the present invention will become fully apparent from the following detailed description, which is to be taken in conjunction with the attached drawings.

BRIEF DESCRIPTION OF THE DRAWINGS

FIG. 4 is a chart showing the relationship between the representation colors used for recording or display and L*a*b*;

FIG. 5 is a view showing reference pixels used in halftone processing;

FIG. 6 is a view showing weighting coefficients in the determination of the average value;

FIGS. 7A and 7B are charts showing the relationship between the colors determined by halftone processing and the colors for recording or display;

FIGS. 8 and 9 are block diagram of a halftone process unit in a second embodiment;

FIG. 13 is a chart showing the relationship between representation colors determined by halftone processing and recording colors;

FIG. 14 is a chart showing the relationship between representation colors and L*a*b*;

FIGS. 15 and 16 are views showing the positions of error distribution;

FIG. 17 is a view showing the weighting coefficients for determining the average value;

FIG. 20 is a chart showing the relationship between the representation colors and L*a*b*;

FIG. 21 is a view showing an example of the weighting coefficients for determining the average value;

FIG. 24 is a table for conversion from record/display colors into recording colors;

FIG. 26 is a chart showing recording characteristics of record/display colors;

FIG. 27 is a chart showing data around the object pixel converted into recording color based on FIG. 26;

FIG. 28 is a chart showing anticipated average values in a case where the object pixel is anticipated;

DETAILED DESCRIPTION OF THE PREFERRED EMBODIMENTS

Now the present invention will be clarified in detail by an embodiment therefor.

In the following description there will be explained L*a*b* color coordinate data as an example of color coordinate data represented by luminosity and hues, but the present invention is also applicable to other color coordinate data such as the L*u*v*, YIQ or Yuv system.

Figure 1:
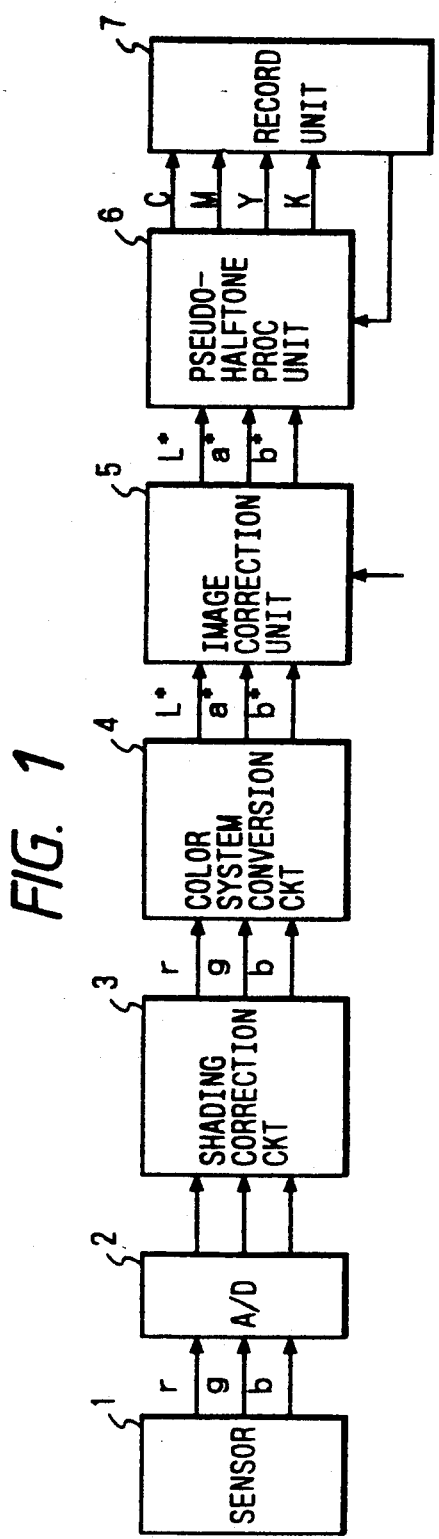
FIG. 1 is a block diagram of a color image processing apparatus constituting an embodiment of the present invention.

FIG. 1 is a scheatic block diagram of an image processing apparatus constituting an embodiment of the present invention. A color image reading unit 1, utilizing a CCD, converts the reflected light from an original image into electrical signals. Said CCD 1 converts the red, green and blue color components, obtained by respective color filters from the reflected light, into respective electrical signals. Thus-obtained analog electrical signals are converted into digital signals by an A/D converter 2. Digital image data r, g, b are subjected to the correction for fluctuations among the CCD elements by a shading correction circuit 3. A color system conversion system 4 converts the entered data r, g, b into L*, a*, b* data, wherein L* represents luminosity while a* and b* represent hues, and L*, a* and b* constitute a color space capable of representing all the colors.

An image correction unit 5 effects image data editing, including image sharpening on the L* signal such as edge emphasis, and color conversion, image enlargement or reduction on the a*b* space. A pseudo-halftone process unit 6, featuring in the present embodiment, receives the multi-value data represented by L*a*b* system as the input image signals and effects a pseudo halftone processing, based on data representing eight colors C, M, Y, K (black), R, G, B and W (white) reprodudible on a recording unit 7, thereby sending binary recording signals C, M, Y and K to the recording unit 7.

Now there will be explained in detail a first embodiment of the pseudo halftone process unit 6, with reference to block diagrams shown in FIGS. 2 and 3.

First Embodiment

Figure 2:
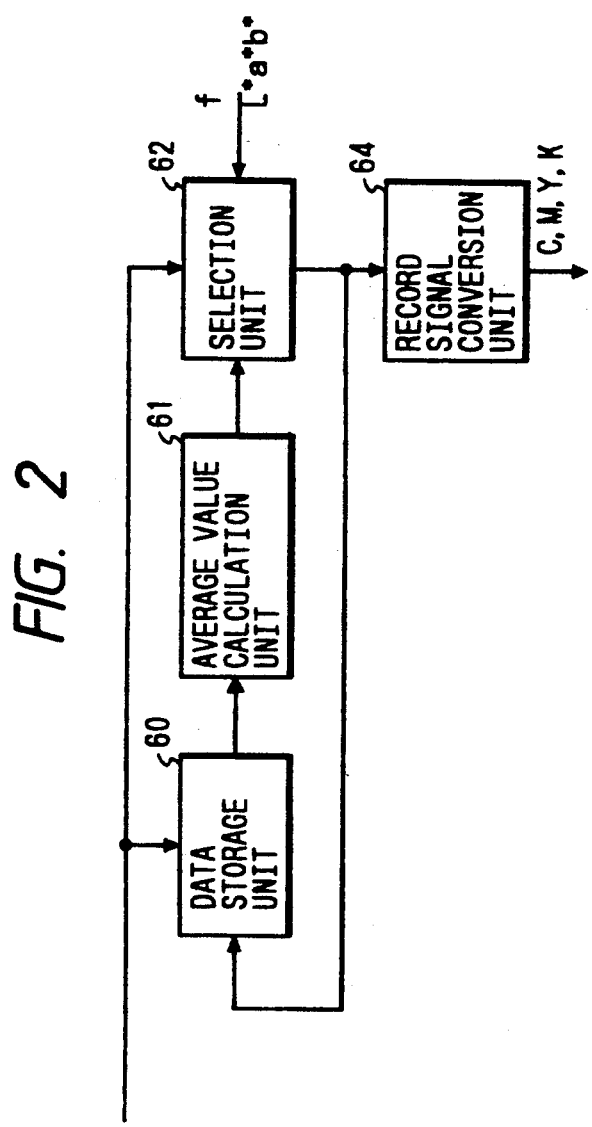
FIGS. 2 and 3 are block diagrams of a halftone processing unit in the first embodiment.

Referring to FIG. 2, a selection unit 62 selects, among 8 representation colors (3 bits) of M, Y, B, G, R, W and K, the closest one to the input image f (represented by L*a*b*), and the corresponding 3-bit signal to a data storage unit 60 and a record signal conversion unit 64. The record signal conversion unit 64 effects a table conversion of the selected color into independent 4-bit record signals of C, M, Y and K. On the other hand, the data storage unit 60 converts, based on 3-bit selection signals each representing one of the aforementioned 8 colors and retained for a one-line period, the representation color of each of several pixels around the object pixel into one of separately entered L*a*b* data of eight colors. An average value calculation unit 61 effects a weighted average calculation in the L*a*b* space from the already selected and determined data of representation color around the object pixel, and sends the obtained average values to the selection unit 62. The selection unit 62 determines the representation color of the object pixel in consideration of said average values.

In the following the algorithm of this processing will be explained in detail, with reference to FIG. 3.

Figure 3:
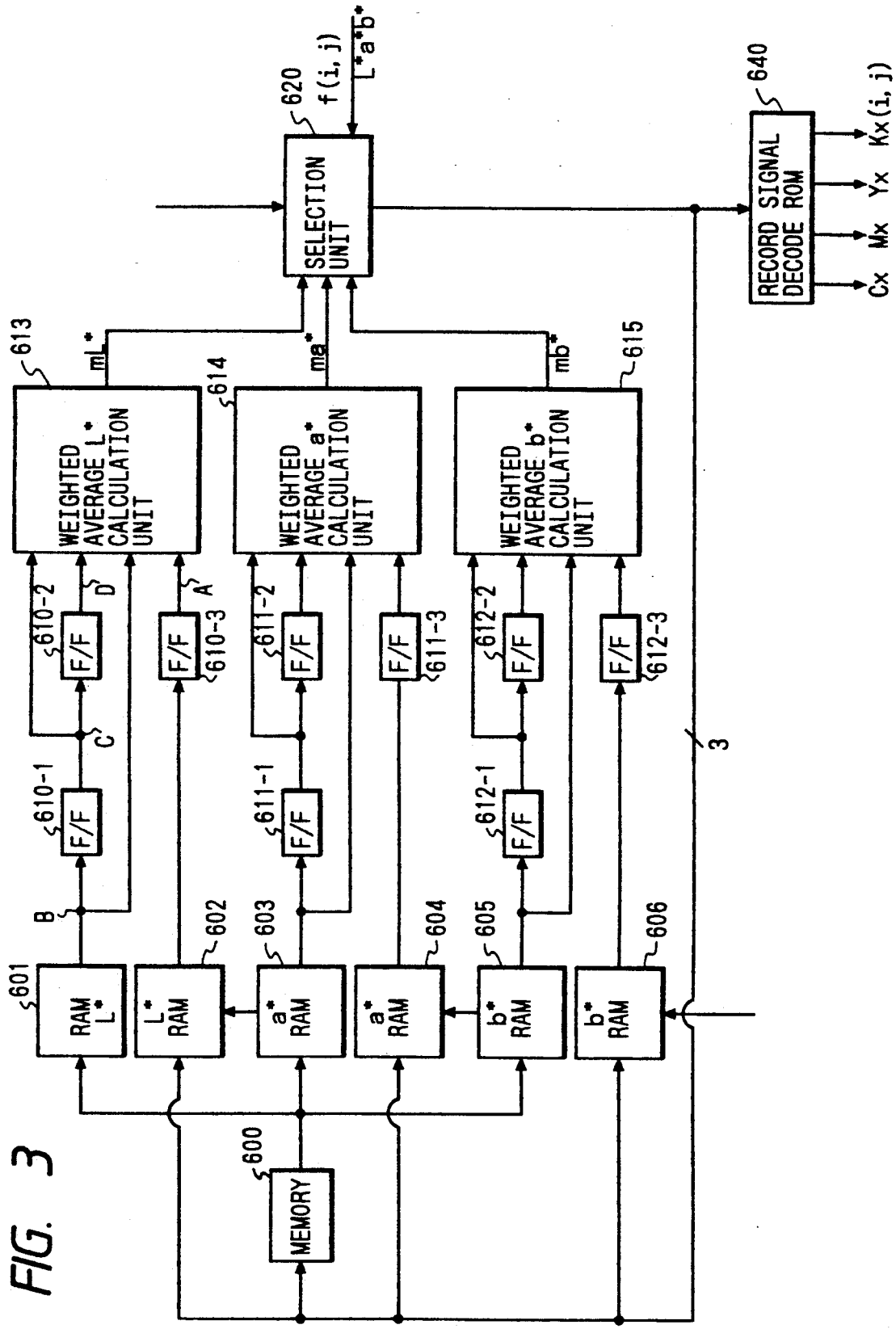

Referring to FIG. 3, 3-bit color data (corresponding to C, M, Y, B, G, R, W or K) from the selection unit 620 are supplied to the line delay memory 600 and data conversion RAM's 602, 604 and 606. The data L*, a* and b* are respectively converted by said RAM's 602, 604 and 606. Similarly data L*, a* and b* delayed by a line in the memory 600 are respectively converted by RAM's 601, 603 and 605. The conversion data are provided and stored in advance, for example from an unrepresented CPU, as data of the output device connected thereto.

In the present embodiment, the eight representation colors are converted into L*a*b* data by a conversion table shown in FIG. 4.

The data conversion by the RAM allows to reduce the bit width of the externally connected memory 600.

In the following there will be given an explanation on thus converted data L*. The color data x (corresponding to one of the aforementioned 8 colors) selected by the selection unit 620 for the object pixel are converted into data $L_x^*$ by the RAM 602, and stored for a pixel period in a flip-flop (F/F) 610-3. Similarly the color data of the preceding line are converted by the RAM 601 and respectively stored by a pixel period by F/F's 610-1 and 610-2. Thus, when the object pixel is positioned at the input terminal of the F/F 610-3, the data of the pixels adjacent to the object pixels, as shown in FIG. 5 are positioned in the following manner that those of the immediately preceding pixel A are at the output terminal of the F/F 610-3, those of the pixel D in the preceding line at the output terminal of the F/F 610-2, and those of the pixels B, C respectively at the input and output terminals of the F/F 610-1.

A weighted average L* calculation unit 613 calculates a weighted sum of the data L* of four pixels A, B, C and D shown in FIG. 5, by multiplying by the weights shon in FIG. 6. It is to be noted that a weight 8/16 is also allotted to the object (or "objective") pixel, but, in the above-mentioned operation, an average mL* is calculated in the following manner on 4 pixels excluding the object pixel to be digitized:

$$mL^*(i,j) = (1 \times L_D^* + 3 \times L_C^* + 1 \times L_B^* + 3 \times L_A^*)$$

Similar operations are simultaneously conducted also in the a*b* space, by a weighted average a* calculation unit 614 and a weighted average b* calculation unit 615 in the following manner:

$$ma^*(i,j) = (1 \times a_D^* + 3 \times a_C^* + 1 \times a_B^* + 3 \times a_A^*)$$

$$mb^*(i,j) = 1 \times b_D^* + 3 \times b_C^* + 1 \times b_B^* + 3 \times b_A^*)$$

wherein, for example, LD*, aD* and bD* represent color data at the position of the pixel D, assuming values $L_D^* = 60$, $a_D^* = -20$ and $b_D^* = -40$ for example for cyan (C) color, according to the table shown in FIG. 4.

In the following there will be explained the process of the selection unit 620, which receives said averages mL*, ma*, mb* and selects one of eight representation colors.

Said selection unit 620, in anticipation for the cases where the object pixel is represented by the aforementioned eight colors, calculates the anticipated average values $mL_x^*$, $Ma_x^*$, $mb_x^*$ including the object pixel, by adding $L_x^*$, $a_x^*$, $b_x^*$ values for each of said eight colors multiplied by a weight "8" (FIG. 6) to the values obtained in the weight average calculation units 613, 614 and 615. For example, following calculations are conducted if the object pixel is anticipated as cyan (C):

$$mL_C^* = \{mL^*(i,j) + 8 \times 60\} \times 1/16,$$

$$ma_C^* = \{ma^*(i,j) - 8 \times 20\} \times 1/16,$$

$$mb_C^* = \{mg^*(i,j) - 8 \times 40\} \times 1/16.$$

Similarly, if the object pixel is anticipated as magenta (M):

$$mL_M^* = \{mL^*(i,j) + 8 \times 50\} \times 1/16,$$

$$ma_M^* = \{ma^*(i,j) - 8 \times 70\} \times 1/16,$$

$$mb_M^* = \{mg^*(i,j) - 8 \times 20\} \times 1/16.$$

In a similar manner, there are calculated $mL_Y^*$, $ma_Y^*$, $mb_Y^*$ for anticipated yellow (Y), $mL_K^*$, $ma_K^*$, $mb_K^*$ for anticipated black (K), $mL_R^*$, $ma_R^*$, $mb_R^*$ for anticipated red (R), $mL_G^*$, $ma_G^*$, $mb_G^*$ for anticipated green (G), $mL_B^*$, $ma_B^*$, $mb_B^*$ for anticipated blue (B), and $mL_W^*$, $ma_W^*$, $mb_W^*$ for anticipated white (W).

Then the distance E between the data L*, a*, b* of the object pixel f(i,j) and each of the above-mentioned eight sets of average values is calculated in the following manner. For example, when the object pixel is anticipated as cyan, said distance $\Delta E_C$ is determined as:

$$\Delta E_C = (L^* - mL_C^*)^2 + (a^* - ma_C^*)^2 + (b^* - mg_C^*)^2.$$

Similarly the distances $\Delta E_M$, $\Delta E_Y$, $\Delta E_K$, $\Delta E_R$, $\Delta E_G$, $\Delta E_B$ and $\Delta E_W$ for the remaining colors are determined.

Then the minimum of said distances $\Delta E$ is determined according to the following equation:

$$x = min<E_X>, \quad x = C, M, Y, K, R, G, B \text{ or } W.$$

The selected color x for the object pixel is a color having minimum distance $\Delta E$ among these eight colors. For example, if $\Delta E_M$ is smallest among the distances $\Delta E$ for said eight colors, the selection unit 620 selects the color M for the object pixel. Said selected color is supplied to the memory 600, and RAM's 602, 604, 606 for use in the halftone processing of subsequent pixels and also to a record signal decoding ROM 640 for conversion into a record signal.

The record signal decode ROM 640 converts the selected color into a record color, according to a table shown in FIG. 7A. For example, a record color M is released in response to the selected color M from the selection unit 620, and record colors C and M in response to the selected color B.

FIG. 7B shows a table to be used for converting the selected colors from the selection unit 620 into R, G, B data, in case a display unit based on R, G, B system is used as an output unit.

As explained in the foregoing, the present embodiment can easily provide color data, by a table conversion, for the output unit of YMCK or RGB color system.

Also in the present embodiment, it is possible to reduce the amount of processing while avoiding the deterioration in image quality, by reducing the bit width for the data a*, b* at the conversion from R, G, B ata into L*, a*, b* data, because the hues are not affected appreciably by the bit width reduction of the a*, b* data for example from eight bits to six bits.

The above-explained process is repeated for the every entered image data L*, a*, b* whereby the pseudo halftone processing of a full-color image is completed.

As explained in the foregoing, this 1st embodiment can reproduce an image more faithful to the original color image, by determining the record or representation color based on the input L*a*b* data, in comparison with the conventional case of independent determination of record color for each color.

A smooth color image can be reproduced, at the determination of the record color, by the use of pseudo halftone processing with approximation to the average value of L*, a*, b* of plural pixels around the object pixel.

Second Embodiment

Figure 9:
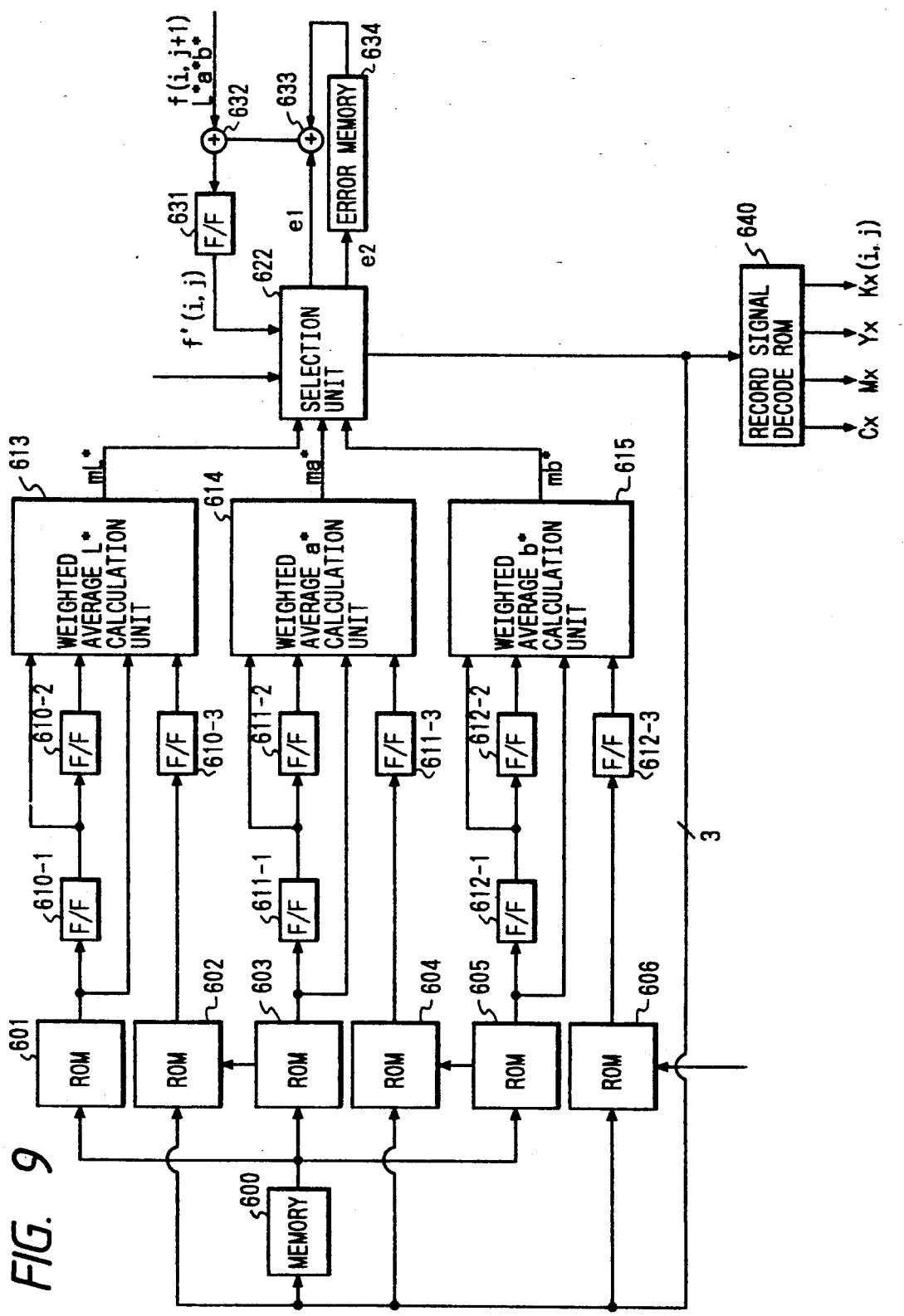

A second embodiment, to be explained with reference to FIGS. 8 and 9, is to correct a color selection error ΔE, generated in the color selection of the 1st embodiment. Referring to FIG. 8, a selection unit 65 calcualtes the error generated at the color selection, in addition to the process in the 1st embodiment. An error correction unit 63 corrects the L*a*b* data of the input image data accordingly, and the corrected input image data $L_f^*$, $a_f^*$, $b_f^*$ are supplied to said selection unit 65 for determining the representation color of the object pixel. More specifically, when the object pixel is determined as color x (=C, M, Y, K, R, G, B or W), the distance $\Delta E_x$ to the input image data is given by:

$$\Delta E_x = (L_f^* - mL_x^*)^2 + (a_f^* - ma_x^*)^2 + (b_f^* - mb_x^*)^2,$$

and the errors ΔL*, ΔAa*, Δb* are given by:

$$\Delta L^* = L_f^* - mL_x^*$$

$$\Delta a^* = a_f^* - mL_x^*$$

$$\Delta b^* = b_f^* - mL_x^*.$$

Said errors are respectively divided into two for generating data e1(l,a, b) and e2(l, a, b) for respectively correcting the data of a succeeding pixel position (i, j+1) and those of a pixel (i+1, j) adjacent in the succeeding line, in the following manner:

$$e1(i, j+1) = (\Delta L^*/2, \Delta a^*/2, \Delta b^*/2),$$

$$e2(i+1, j) = (\Delta L^* - \Delta L^*/2, \Delta a^* - \Delta a^*/2, \Delta b - \Delta b^*/2)$$

Referring to FIG. 9, the error data e2 for correcting the pixel in the succeeding line are supplied to an error memory 634, and error data e2 (i, j+1) which were generated in the preceding line and delayed by a line in said memory are added, together with the presently generated error data e1(i, j+1) for correcting the succeeding pixel, to the data L*, a*, b* in an adder 633.

The error correction is completed by adding thus obtained results of addition to the input image data f(i, j+1) in an adder 632. Consequently, the corrected image data f'(i, j), obtained from an F/F 631, can be written as:

$$f'(i, j) = f(i, j) + e1(i, j) \, e2(i, j).$$

The above-explained error correction is conducted on every input image data.

Thus the present second embodiment can provide a reproduced image which is more faithful to the original image and is smoother, by adopting the correction of error generated at the color selection, in addition to the processing in the first embodiment.

Third Embodiment

Figure 10:
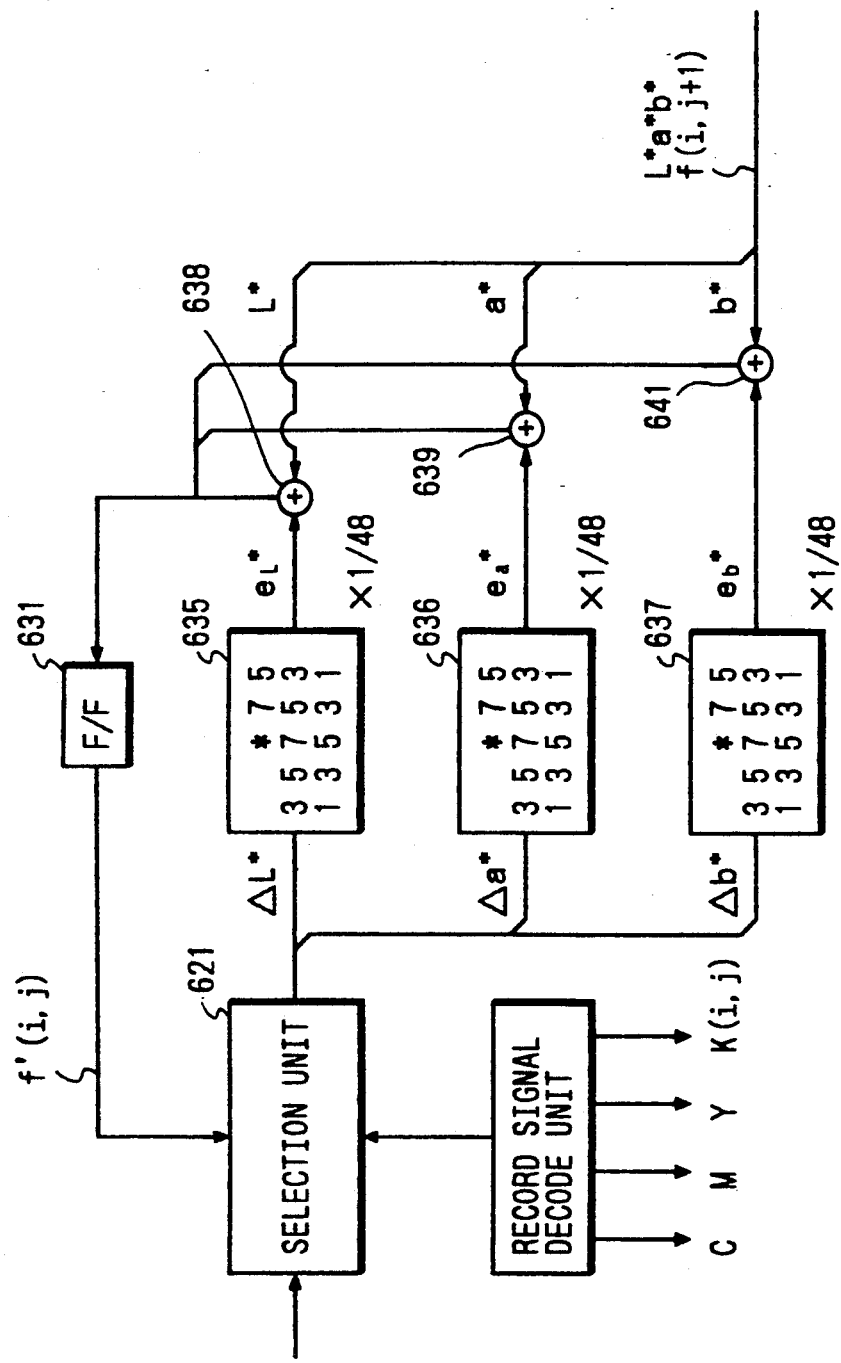
FIG. 10 is a blk diagram of a halftone process unit of a third embodiment.

The foregoing first and second embodiments are to effect pseudo-halftone processing on the object pixel, based on the already determined selected colors in the vicinity of the object pixel. A third embodiment, shown in FIG. 10, is to directly determine the record color at the object pixel position, by expanding the error correction area. At first a selection unit 621 determines a distance ΔE between the error-corrected input image data f'(i, j) to be explained later and each of the aforementioned eight colors. For example, if the object pixel is anticipated as cyan color, said distance $\Delta E_C$ can be determined in the following manner, from the $L_C^*$, $a_C^*$, $b_C^*$ data for cyan color shown in FIG. 4:

$$\Delta E_C = (L_f^* - 60)^2 + (a_f^* - (-20))^2 + (b_f^* - (-40))^2.$$

Similarly the distance $\Delta E_M$ for anticipated magenta color is:

$$\Delta E_M = (L_f^* - 50)^2 + (a_f^* - 70)^2 + (b_f^* - (-20))^2.$$

There are also similarly determined $\Delta E_Y$, $\Delta E_K$, $\Delta E_r$, $\Delta E_G$, $\Delta E_B$ and $\Delta E_W$. Thus the selected color x is a color showing minimum distance $\Delta E_x$, as indicated by:

$$x = min < \Delta E_x >, x = C, M, Y, K, R, G, B \text{ or } W.$$

The error correction is conducted as follows.

For a selected color x, the selection errors ΔAL*, Δa*, ΔAb* are given by:

$$\Delta L^* = (L_f - L_x^*),$$

$$\Delta a^* = (a_f - a_x^*),$$

$$\Delta b^* = (b_f - b_x^*).$$

These errors are districuted to twelve pixels, surrounding the object pixel; as shown in error correction units 635, 636, 637 shown in FIG. 10.

Thus the correction data $e_f^*$, $e_a^*$, $e_b^*$ for the next pixel position (i, j+1) are given by the additions of $\Delta L^* \times 7/48$, $\Delta a^* \times 7/48$ and $\Delta b^* \times 7/48$.

In this manner the data $e_f^*$, $e_a^*$, $e_b^*$ for correcting the data of the next pixel are cumulative value of errors distributed from twelve already-selected pixel positions, and the error correction is completed by the addition of said correction data to the input image data in adders 638, 639 and 641. Each of the error correction units 635, 636, 637 is provided with an error memory of a capacity of two lines.

In the following first to third embodiments, there is shown a selection from eight colors based on binary recording of C, M, Y and K colors, but a multi-value pseudo halftone processing of high image quality is also possible by registering a larger number of representation colors in the form of L*a*b* data, if a multi-level recording is available for each color, as in electrophotographic recording with pulse width modulation, thermal recording with a thermal head, or ink jet recording with multiple dot recording utilizing inks of different densities.

Also it will be readily understood that the apparatus functions as a printer, by the supplying for example of a computer graphic image from the outside in the form of L*a*b* data to the input/output port of the image correction unit shown in FIG. 1, or of the R, G, B data to the input terminal of the color system conversion circuit.

As explained in the foregoing, the first and third embodiments are capable of reproducing colors faithful to the input image position, namely to the input color image, by a halftone processing of the input image data in a color space represented by luminocity and hue. Also, there can be obtained an image of improved quality of correction of the error generated at the conversion to the recording or representation color.

Furthermore, these embodiments allow faithful color representation regardless of the colors representable on the output device, thereby facilitating system construction.

Fourth Embodiment

Figure 11:
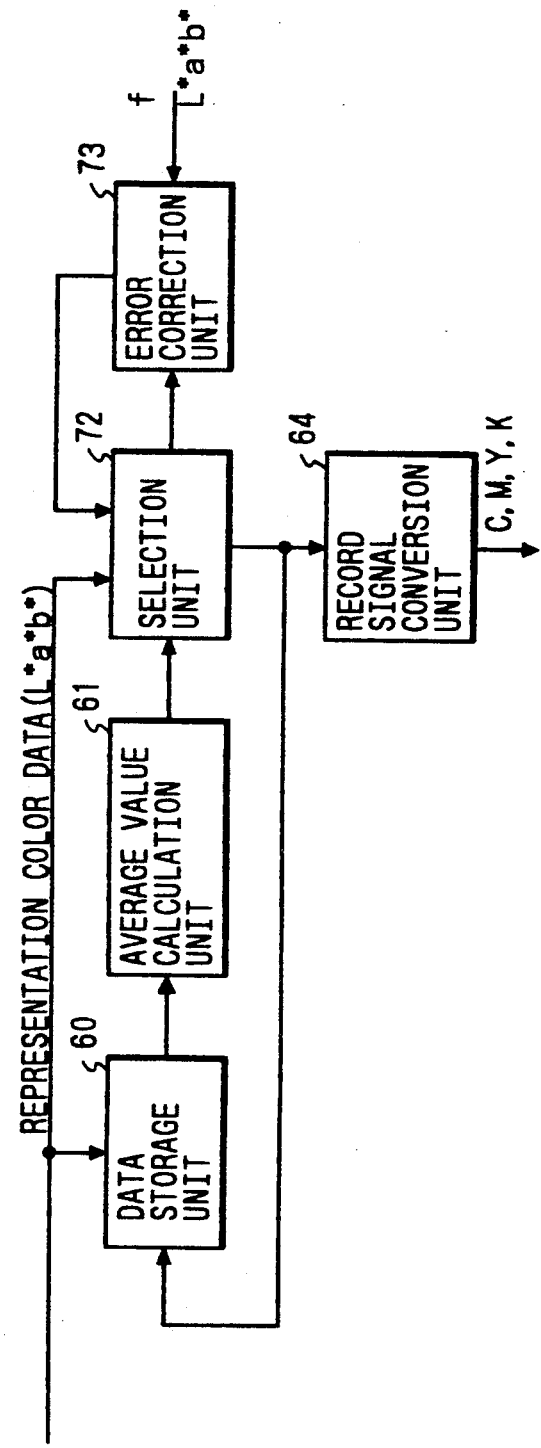
FIGS. 11 and 12 are block diagrams of a halftone process unit in a fourth embodiment.
Figure 12:
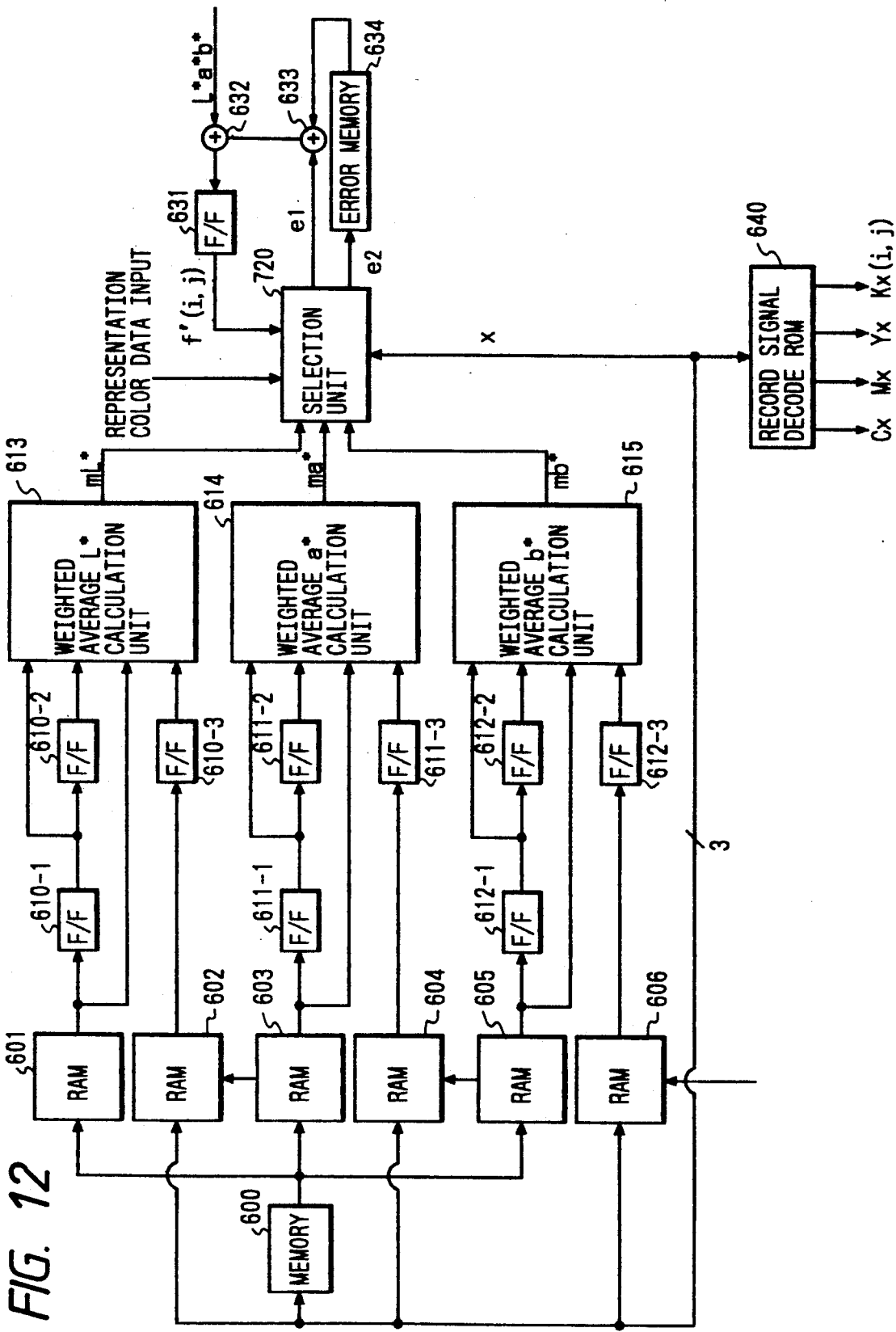

In the following there will be explained, with reference to FIGS. 11 and 12, a fourth embodiment in which the error correction explained in the second embodiment is conducted in adaptive manner. In FIGS. 11 and 12, components other than a selection unit 72, an error correction unit 73 and a selection unit 720 are the same as those in FIGS. 8 and 9 and are therefore represented by the same numbers.

The selection unit 72 in FIG. 11 selects, for each pixel, a representation color closest to the input image f, in consideration of the surrounding pixels (this operation being hereinafter called re-digitization). In the present embodiment, the recording device is composed of a printer capable of binary recording of four colors C, M, Y and K, so that the representation color for each pixel is one of eight colors C, M, Y, B (CM), G (CY), R (MY), W and K. The selected eight colors are represented by 3-bit values (0-7) which are converted in the record signal conversion unit 64 into binary signals of C, M, Y and K. FIG. 13 shows the relationship between the re-digitized signal x and the record signal. Said re-digitized signal x is entered into the data memory unit 60, which retains the re-digitized data of pixels in a two-dimensional area around the object pixel which has just been re-digitized, and the average calculation unit 61 calculates the average image color from said data of plural pixels and enters said average image color into the aforementioned selection unit 72. Since the average calculation unit 61 effects calculation in the $L^*a^*b^*$ space, it converts the representation color based on the re-digitized data x retained in the data memory unit 60 into $L^*a^*b^*$ data. The error correction unit 73 receives the digitizing error generated at the re-digitization by the selection unit 72, and corrects the data of the surrounding pixels. Consequently the above-mentioned re-digitization is conducted on thus error-corrected input image signal.

In the following the algorithm of the above-explained process will be explained in detail with reference to FIG. 12.

Referring to FIG. 12, the re-digitized signal x is supplied to a memory 600 for a delay of about one line Said signal and a re-digitized signal of the preceding line are supplied to input address terminals of RAM's 602, 601, 604, 603, 606 and 605, which, based on said re-digitized signals x, convert the representation color data corresponding to said signals x to $L^*a^*b^*$ color coordinate data. More detailedly, RAM's 601, 602 effect conversion from the representation colors x into $L^*$ data, RAM's 603, 604 into $a^*$ data and RAM's 605, 606 into $b^*$ data. In the present embodiment said conversions are conducted according to a table shown in FIG. 14.

Among the $L^*_x$, $a^*_x$, $b^*_x$ data converted from the re-digitized signals x, the data of 4 pixels adjacent to the object pixel in the $L^*$, $a^*$ and $b^*$ spaces are positioned respectively at terminals of F/F's 610-1, 610-2, 610-3; F/F's 611-1, 611-2, 611-3; and F/F's 612-1, 612-2, 612-3. More specifically, the $L^*$ data $L^*_A$, $L^*_B$, $L^*_C$ and $L^*_D$ of pixels A, B, C and D adjacent to the object pixel, as shown in FIG. 5, are respectively positioned at the output of F/F 610-3, input and output of F/F 610-1, and output of F/F 610-2. Similarly the $a^*$ data $a^*_A$, $a^*_B$, $a^*_C$ and $a^*_D$ of said 4 pixels are positioned at the output of F/F 611-3, input and output of F/F 611-1, and utput of F/F 611-2, and the $b^*$ data $b^*_A$, $b^*_B$, $b^*_C$ and $b^*_D$ of said 4 pixels are obtained at the output of F/F 612-3, input and output of F/F 612-1, and output of F/F 612-2. The weighted average calculation units 613, 614, 615 independently determine the average values $mL^*$, $ma^*$ and $mb^*$ respectively in the $L^*$, $a^*$ and $b^*$ spaces, by applying the weighting coefficients shown in FIG. 21 to said adjacent 4 pixels and the object pixel to be re-digitized now, in the following manner:

$$mL^* = 1 \times L^*_D \times L^*_C \times L^*_B \times L^*_A$$

$$ma^* = 1 \times a^*_D \times a^*_C \times a^*_B \times a^*_A$$

$$mb^* = 1 \times b^*_D \times b^*_C \times b^*_B \times b^*_A$$

These average values $mL^*$, $ma^*$, $mb^*$ are supplied to the selection unit 720, and the calculation of average values is completed by anticipating the re-digitization of the object pixel with a weight 6 given to the object pixel position. More specifically, if the object pixel is anticipated as cyan color (x=0), the average values $mL^*_0$, $ma^*_0$, $mg^*_0$ are given by:

$$mL^*_0 = (mL^* + 6 \times L^*_0) \times 1/16,$$

$$ma^*_0 = (mb^* + 6 \times a^*_0) \times 1/16,$$

$$mb^*_0 = (mb^* + 6 \times b^*_0) \times 1/16,$$

Similarly, the average values $mL^*_x$, $ma^*_x$, $mb^*_x$ for an anticipated re-digitized color x are given by:

$$mL^*_x = (mL^* + 6 \times L^*_x) \times 1/16,$$

$$ma^*_x = (mL^* + 6 \times L^*_x) \times 1/16,$$

$$mb^*_x = (mL^* + 6 \times L^*_x) \times 1/16,$$

In this manner there are determined eight sets of anticipated average values for the representable eight colors. The selection unit 720 calculates the distances $\Delta E_x^2$ between said eight sets of anticipated average values and the error-corrected input image data f'(i, j) to be explained later, according to the following equation, and determines a value x showing the minimum distance as the re-digitized data:

$$\Delta E_x^2 = (L^*_f - mL^*_x)^2 + (a^*_f - ma_{lx})^2 + (b^*_f - mb^*_x)^2$$

wherein $L^*_f$, $a^*_f$, $b^*_f$ are $L^*a^*b^*$ space data of f'(i, j);

$$X_{ij} = min(\Delta E_x^2).$$

As the representation color (x=0-7) determined as explained above and the input image f' correlated by the minimum $\Delta E_x^2$, the re-digitization errors $\Delta L^*$, $\Delta a^*$ and $\Delta b^*$ are defined as follows:

$$\Delta L^* = L^*_f - mL^*_x,$$

$$\Delta a^* = a^*_f - ma^*_x,$$

$$\Delta b^* = b^*_f - mb^*_x.$$

In the following there will be given a detailed explanation on the correction for the above-mentioned re-digitization error.

The above-mentioned error is basically corrected in two pixels, namely a pixel f(i, j+1) to be re-digitized next and a pixel f'(i+1, j) adjacent in the next line, but the amount of correction is adaptively limited as shown in the following, according to the generated error:

$$\Delta L^* = \pm a_L \text{ if } |\Delta L^*| > a_L$$

$$\Delta a^* = \pm a_a \text{ if } |\Delta a^*| > a_a$$

$$\Delta b^* = \pm a_b \text{ if } |\Delta b^*| > a_b$$

wherein $a_L$, $a_a$, $a_b$ are constants.

The above-explained process prevents the blurring of the re-digitized image in the case of an abrupt change in the input image. More specifically, a large error between the average value and the input image occurs in an area of abrupt change of the input image, and such area is identified as an edge of the image and all the error is corrected to prevent blurring in the generated image.

The above-mentioned re-digitization errors, $\Delta L^*$, $\Delta a^*$, $\Delta b^*$ are distributed, as shown in FIG. 15, as a correction e1 to the next pixel position and a correction e2 to the pixel in the next line, in the following manner:

$$e1(i, j+1) = (\Delta L^*/2, \Delta a^*/2, \Delta b^*/2),$$

$$e2(i, j+1) = (\Delta L^* - \Delta L^*/2, \Delta a^* - \Delta a^*/2, \Delta b^* - \Delta b^*/2).$$

The error correction e2 for the pixel of the next line is supplied to an error memory 634 shown in FIG. 12, and is also supplied therefrom to the preceding line to read the error e2 (i, j+1) already retained for a line period, which is added to the presently generated e1 (i, j+1) in an adder 633. The output of said adder represents the error correction for the next pixel f (i, j−1) and is added in an adder 632 to the input image data in the following manner:

$$f'(i, j+1) = f(i, j+1) + e1 (i, j+1) + e2 (i, j+1).$$

The above-mentioned error correction is conducted independently in the L*, a* and b* spaces in the weighted average calculation units 613, 614, 615. The error-corrected input image data f'(i, j+1) are supplied from the F/F 631 to the selection unit 720 in synchronization with the next pixel data clock signal, and are subjected to the re-digitization process explained above. The record signal decoding ROM 640 shown in FIG. 12 effects conversion from the re-digitized signal x to the binary record signals Cx, Mx, Yx, Kx according to a table shown in FIG. 13.

In the following there will be explained variations of the error correction unit in the fourth embodiment.

In the fourth embodiment, the error is distributed to two adjacent pixels, but an error distribution over a larger area for example with error distribution ratios shown in FIG. 16 allows one to suppress the formation of unpleasant texture of low frequency in the re-digitized image.

Also same effect can be attained by varying the error distribution ratio for each pixel in the following manner, utilizing a pseudo-random number PN:

$$e1(i, j+1) = \left(\frac{P}{8}\Delta L^*, \frac{P}{8}\Delta a^*, \frac{P}{8}\Delta b^*\right),$$

$$e2(i+1, j) = \left(\Delta L^* - \frac{P}{8}\Delta L^*, \Delta a^* - \frac{P}{8}\Delta a^*, \Delta b^* - \frac{P}{8}\Delta b^*\right),$$

wherein $P = 3$ if $PN = 1$, or $P = 5$ if $PN = 0$.

The 1-bit pseudo.random number generator to be employed can be composed of a 1-bit shift register of about 25 stages, by the use of so-called M-series codes, for generating pseudo-random numbers without periodicity in the processing of an image of A3-sized original image.

Also, in the fourth embodiment, blurring of the re-digitized image is prevented by limiting the generated eor at a predetermined value, but, for faithfully reproducing the edge information of the input image in the re-digitized image, it is most effective to suspend the error correction in the L* space representing the luminosity, as indicated by:

$$\Delta L^* = 0, \text{ if } |\Delta L^*| > \beta_L,$$

$$\Delta a^* = \pm a_a, \text{ if } |\Delta a^*| > a_a$$

$$\Delta b^* = \pm a_b, \text{ if } |\Delta b^*| > a_b$$

wherein $a_a$, $a_b$ and $a_L$ are constants.

Also in these embodiments, re-digitization more faithful to the original image can be attained by selecting said constants $\alpha$, $\beta$ according to the input image, for example larger for an ordinary photographic image and smaller for a screen-toned image. It is furthermore possible to automatically vary said constants $\alpha$, $\beta$ by the microscopic features of the image, for example edge information, in the course of image reading.

Furthermore, in the foregoing embodiment, the adaptive processing is conducted according to the errors $\Delta L^*$, $\Delta a^*$, $\Delta b^*$ which are defined as the difference between the error-corrected input image signal and the anticipated average values, but the change in the input image can be more effectively reflected on the result y an adaptive processing on a newly defined difference $\delta L^*$ with respect to the input image signal f before error correction, in the following manner:

$$\delta L^* = L^*_f - mL^*_x,$$

$$\Delta L^* = 0, \text{ if } |\delta L^*| > \beta_L$$

$$\Delta a^* = \pm a_a, \text{ if } |\Delta a^*| > a_a$$

$$\Delta b^* = \pm a_b, \text{ if } |\Delta b^*| > a_b.$$

Furthermore, in the 4th embodiment, the average value in any of the L*, a* and b* spaces is calculated from the data of already re-digitized four neighboring four pixels, but a re-digitized image more faithful to the original image can be obtained by selecting a larger area for average value calculation in the L* space than in the a* and b* spaces.

Furthermore, the weighting coefficients in different pixel positions are not limited to those shown in the foregoing embodiments, and a better re-digitized image can be obtained if said coefficients are larger as the position is closer to the object pixel position and smaller as the position is farther.

Furthermore, the foregoing fourth embodiment is to effect re-digitization into eight representative colors of C, M, Y, K, R, G, B and W based on binary recording of four colors C, M, Y and K, but more faithful black color reproduction can be attained by re-digitization with 11 colors additionally including:

$$CK = C+K, MK = M+K \text{ and } YK = Y+K.$$

In this case the conversion to the record signals is conducted by C=1, K=1 for CK; M=1 K=1 for MK; and Y=1, K=1 for YK. In this process, in an area close to black, the recording dots are less frequently recorded in a single color but can be re-digitized in dark gray with more faithful hue.

Also for more faithful re-digitization of light gray in the case of ink jet recording with inks of different densities or electrophotographic recording with pulse width energy modulation, there may be employed three-level black recording with an intermediate level WK with same L*a*b* values employing black ink of lower density, or WK=0.5K attained with a half dot size, and the re-digitization may be conducted with nine colors including such intermediate black level in addition to the foregoing eight colors.

This method may be further expanded to C, M and Y to obtain re-digitized image of improved quality, through the increase in intermediate record/representation colors.

As explained in the foregoing, the fourth embodiment determined the average values in L*, a* and b* spaces based on the already re-digitized data and on the anticipated re-digitization of the object pixel, determines the differences ΔE between said values and the input image signal, thus obtains a recording signal for each pixel by selecting a record color with smallest difference, and adaptively controls the distribution to the adjacent pixels of the error generated in the re-digitization, thereby faithfully reproducing any input image signals such as of halftone image. or character image.

Also, said fourth embodiment, effecting halftone processing of the input image data in a color space represented by luminosity and hue, is capable of reproducing colors faithful to the input color image, and adaptively corrects the error generated in the conversion to the representation color, thereby providing an image of high quality without blur in the image.

Fifth Embodiment

In the foregoing first to fourth embodiment, there is conducted pseudo alftone processing in the L*a*b* space. In the fifth embodiment, there is conducted pseudo-halftone processing in an $X^{\frac{1}{3}}Y^{\frac{1}{3}}Z^{\frac{1}{3}}$ space. The circuit structure of the present fifth embodiment is the same as shown in FIG. 1 and is therefore not explained, and the following description be concentrated on the psuedo-halftone processing unit.

Figure 18:
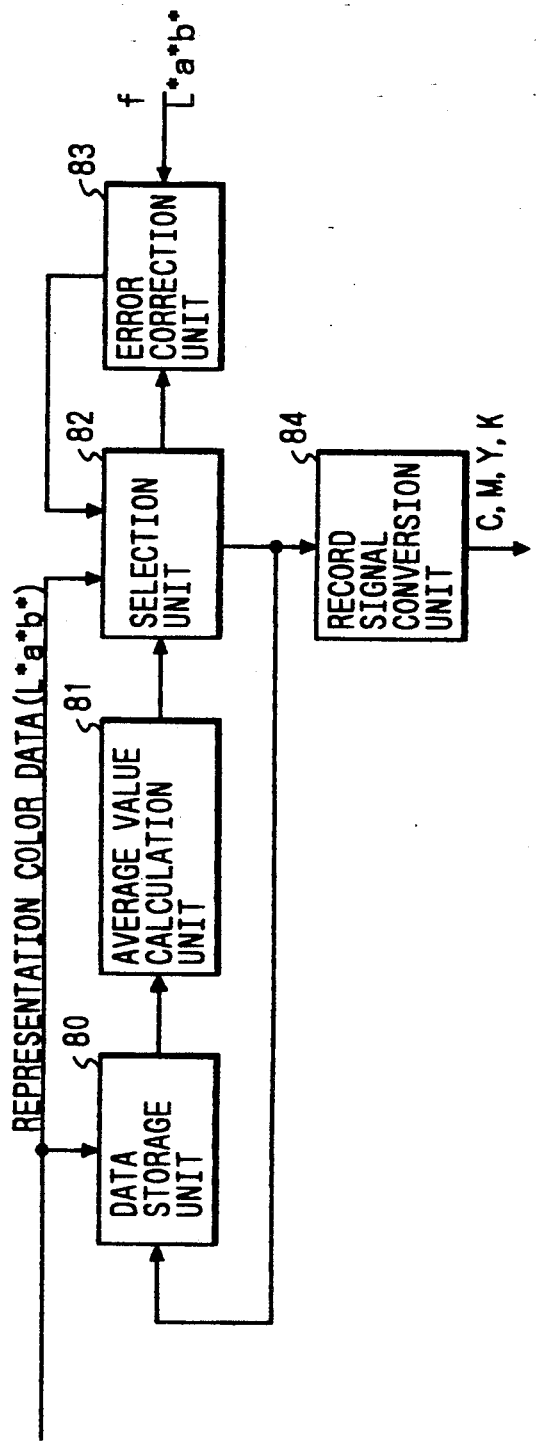
FIGS. 18 and 19 are block diagrams of a halftone process unit in a fifth embodiment.

Referring to FIG. 18, a selection unit 83 selects a representation color closest to the input image f for each pixel, in consideration of the surrounding situation (this operation being hereinafter called re-digitization). In the present embodiment there is employed a recording device capable of binary recording in four colors of G, M, Y and K, so that there can be selected eight representation colors of C, M, Y, B (CM), G (CY), R (MY), W and K (black) for each pixel. Each selected color x is represented by a 3-bit value (0–7) and is converted into binary signals of C, M, Y and K in a record signal conversion unit 84. The relation between the re-digitized signals x and the record signals is same as shown in FIG. 13. Said re-digitized signal x is supplied to a data storage unit 80, which two-dimensionally retains the re-digitized data of pixels around the object pixel just subjected to the re-digitization. An average calculation unit 81 calculates the average image color from the data of said plural pixels, and supplies the obtained result to said selection unit 82. Since the calculation in the average calculation unit 81 is conducted in a $(X)^{\frac{1}{3}} (Y)^{\frac{1}{3}} (Z)^{\frac{1}{3}}$ space, the re-digitized data x stored in the data storage unit 80 are converted into $(X)^{\frac{1}{3}} (Y)1 (Z)^{\frac{1}{3}}$ data. A-error correction unit 83 receives the digitization error generated at the re-digitization in the selection unit 82 and accordingly corrects the adjacent input pixel data. Consequently the aforementioned re-digitization is conducted on the thus error-corrected input image signal.

The algorithm of the above-explained process will be explained in detail with reference to FIG. 19. The re-digitized signal is supplied to a memory 800 for delay for about a line. Said signal and the re-digitized signal of the preceding line are supplied to input address ports of RAM's 802, 801, 804, 803, 806 and 805, which convert the representation color data indicated by the re-digitized signal x into $(X)^{\frac{1}{3}} (Y)^{\frac{1}{3}} (Z)^{\frac{1}{3}}$ color coordinate data. The $(X)^{\frac{1}{3}} (Y)^{\frac{1}{3}} (Z)^{\frac{1}{3}}$ coordinate is a space consisting of cubic roots of values of XYZ coordinate obtained by linear transformation from the RGB coordinate system, and shows substantial linearity to the density. The coordinate values in this space can be easily obtained from those in the L*a*b* space by the following equations:

$$(Y)^{\frac{1}{3}} = \frac{L^* + 16}{116}$$

$$(X)^{\frac{1}{3}} = \frac{a^*}{500} + (Y)^{\frac{1}{3}}$$

$$(Z)^{\frac{1}{3}} = (Y)^{\frac{1}{3}} - \frac{b^*}{200}$$

wherein X, Y and Z: 0–1.0.

The RAM's 801 and 802 effect conversion to $(X)^{\frac{1}{3}}$ data; 803 and 804 effect conversion to $(Y)^{\frac{1}{3}}$ data; and 805 and 806 effect conversion to $(Z(^{\Delta}$ data. FIG. 20 shows the conversion table employed in the present fifth embodiment. A data conversion unit 842 composed of a similar RAM converts the representation color data L*a*b* from a printer into $X^{\frac{1}{3}}Y^{\frac{1}{3}}Z^{\frac{1}{3}}$ space data for the re-digitization judgement to be explained later.

Among the $(X)^{\frac{1}{3}} (Y)^{\frac{1}{3}} (Z)^{\frac{1}{3}}$ data converted from the re-digitized signal x, the data of 4 pixels adjacent to the object pixel in each of the $(X)^{\frac{1}{3}}$, $(Y)^{\frac{1}{3}}$ and $(Z)^{\frac{1}{3}}$ spaces are positioned respectively at the terminals of F/F's 810-1, 810-2, 810-3; F/F's 811-1, 811-2, 811-3; and F/F's 812-1, 812-2, 812-3. More specifically, the $(X)^{\frac{1}{3}}$ data $(X)_A^{\frac{1}{3}}$, $(X)_B^{\frac{1}{3}}$, $(X)_C^{\frac{1}{3}}$ and $(X)_D^{\frac{1}{3}}$ of the pixels A, B, C and D adjacent to the object pixel in FIG. 5 are respectively positioned at the output of F/F 810-3, input and output of F/F 810-1, and output of F/F 810-2. Similarly the $(Y)^{\frac{1}{3}}$ data $(Y)_A^{\frac{1}{3}}$, $(Y)_B^{\frac{1}{3}}$, $(Y)_C^{\frac{1}{3}}$ and $(Y)_C^{\frac{1}{3}}$ are positioned at the output of F/F 811-3, input and output of F/F 811-1 and output of F/F 811-2, and the $(A)^{\frac{1}{3}}$, $(Z)_Z^{\frac{1}{3}}$, $(Z)_B^{\frac{1}{3}}$, $(Z)_C{}^i$ and $(Z)_D{}^i$ are positioned at the output of F/F 813-3, input and output of F/F 813-1, and output of F/F 813-2. Weighted average calculation units 813, 814, 815 independently determine the average values $mX^i$, $mY^i$, $mZ^i$ respectively in the $(X)^i$, $(Y)^i$, $(Z)^i$ spaces, by applying the weighting coefficients shown in FIG. 21 to said adjacent pixels and the object pixel position to be re-digitized now, in the following manner:

$$mX_0{}^i = (mX^i + 6 \times Y_0{}^i) \times 1/16,$$

$$mY_0{}^i = (mY^i + 6 \times Y_0{}^i) \times 1/16,$$

$$mZ_0{}^i = (mZ^i + 6 \times Y_0{}^i) \times 1/16.$$

Similarly the average values for an anticipated re-digitized value x are given by:

$$mX_x{}^i = (mX^i + 6 \times Y_x{}^i) \times 1/16,$$

$$mY_x{}^i = (mY^i + 6 \times Y_x{}^i) \times 1/16,$$

$$mZ_x{}^i = (mZ^i + 6 \times Y_x{}^i) \times 1/16,$$

In this manner there are determined 8 sets of anticipated average values for the representable 8 colors. The selection unit 820 calculates the distances $\Delta E^2$ between said eight sets of anticipated average values and the error-corrected input image data f'(i, j) to be explained later, according to the following equation, and determines a value x showing the minimum distance as the re-digitized data:

$$\Delta E^2 = (X_f{}^i - mX_x{}^i)^2 + (Y_f{}^i - mY_x{}^i)^2 + (Z_f{}^i - mZ_x{}^i)^2$$

$$X_{ij} = min(E_x{}^2).$$

wherein $X_f{}^i$, $Y_f{}^i$ and $Z_f{}^i$ are data in the $(X)^i$ $(Y)^i$ $(Z)^i$ coordinate system converted from the L*a*b* space data of f'(i, j) as explained before.

As the representation color x (=0–7) determined as explained above and the input image f' are correlated by the minimum $\Delta E_x{}^2$, the re-digitization erros $\Delta X^i$, $\Delta Y^i$ and $\Delta Z^i$ are defined as follows:

$$\Delta X^i = X_f{}^i - mX_x{}^i,$$

$$\Delta Y^i = X_f{}^i - mY_x{}^i,$$

$$\Delta Z^i = X_f{}^i - mZ_x{}^i.$$

In the following there will be given a detailed explanation on the correction for the above-explained re-digitization error. The above-mentioned error is basically corrected in two pixels, namely a pixel f(i, j+1) to be re-digitized next and a pixel f'(i+1, j) adjacent in the next line, but the amount of correction is adaptively limited as shown in the following, according to the generated error:

$$\Delta X^i = \pm a_X, \ if \ |\Delta X^i| > a_X,$$

$$\Delta Y^i = \pm a_Y, \ if \ |\Delta X^i| > a_Y,$$

$$\Delta Z^i = \pm a_Z, \ if \ |\Delta X^i| > a_Z,$$

wherein $a_X$, $a_Y$ and $a_Z$ are constants

The above-explained process prevents the blur of the re-digitized image in case of an abrupt change in the input image. More specifically, a large error between the average value and the input image occurs in an area of abrupt change of the input image, and such area is identified as an edge of the image and all the error is corrected to prevent the blur in the generated image.

The above-mentioned re-digitization errors $\Delta X^i$, $\Delta Y^i$, $\Delta Z^i$ are distributed, as shown in FIG. 15, as a correction e1 to the next pixel position and a correction e2 to the pixel in the next line, in the following manner:

$$e1(i, j+1) = (\Delta X^i/2, \Delta Y^i/2, \Delta Z^i/2),$$

$$e2(j+1, i) = \left( \Delta X^i - \frac{\Delta X^i}{2}, \Delta Y^i - \frac{\Delta Y^i}{2}, \Delta Z^i - \frac{\Delta Z^i}{2} \right).$$

Figure 19:
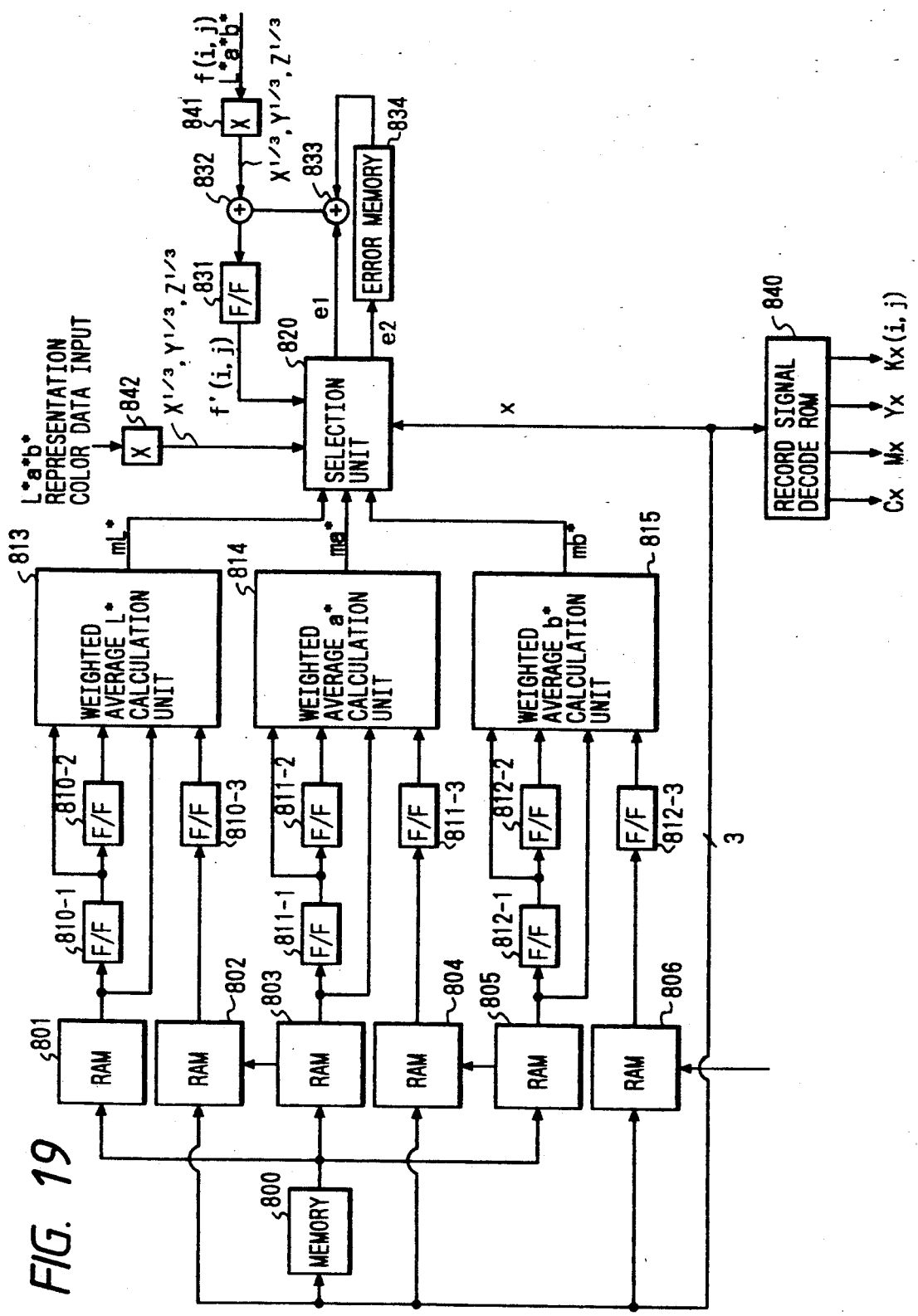

The error correction e2 for the pixel of the next line is supplied to an error memory 834 shown in FIG. 19, and is also supplied therefrom to the preceding line to read the error e2 (i, j+1) already retained for a line period, which is added to the presently generated e1 (i, j+1) in an adder 833. The output of said adder represents the error correction for the next pixel f (i, j+1) and is added in an adder 832 to the input image data in the following manner:

$$f(i, j+1) = f(i, j+1) + e1 \ (i, j+1) + e2(i, j+1).$$

The above-explained error correction is conducted independently in the respective spaces on the input image signals converted in the data conversion unit 841 from the L*a*b* spaces to the $(X)^i$ $(Y)^i$ $(Z)^i$ coordinate system. The error-corrected input image data f'(i, j+1) are supplied from the F/F 831 to the selection unit 820 in synchronization with the next pixel data clock signal, and are subjected to the re-digitization process explained above. The record signal decoding ROM 840 shown in FIG. 19 effects conversion from the re-digitized signal x to the binary record signals Cx, Yx, Mx, Kx according to the table shown in FIG. 13.

In the following there will be explained variations of the error correction unit in the fifth embodiment. In the fifth embodiment, the error is distributed to two adjacent pixels, but an error distribution over a larger area for example with error distribution ratios shown in FIG. 16 allows to suppress the formation of unpleasant texture of low frequency in the re-digitized image.

Also same effect can be attained by varying the error distribution ratio for each pixel in the following manner, utilizing a pseudo-random number PN:

$$e1(i, j+1) = (\Delta X^i, \Delta Y^i, \Delta Z^i),$$

$$e2(j+1, i) =$$

$$\left( \Delta X^i - \frac{P}{8} \Delta X^i, \Delta Y^i - \frac{P}{8} \Delta Y^i, \Delta Z^i - \frac{P}{8} \Delta Z^i \right),$$

wherein $P = 3$ if $PN = 1$, or
$P = 5$ if $PN = 0$.

The 1-bit pseudo-random number generator to be employed can be composed of a 1-bit shift register of about 25 stages, by the use of so-called M-series codes, for generating pseudo-random numbers without periodicity in the processing of an image of an A3-sized original image.

Also, in the fifth embodiment blurring of the re-digitized image is prevented by limiting the generated error at a predetermined value, but, for faithfully reproducing the edge information of the input imae in the re-digitized image, it is most effective to suspend the error correction according to the distance $\Delta E^2$ between the input image data and the anticipated average value.

The error $\Delta E_x^2$ in the re-digitization into x is given by:

$$\Delta E_x^2 = (\Delta X^{\frac{1}{3}})^2 + (\Delta Y^{\frac{1}{3}})^2 + (\Delta Z^{\frac{1}{3}})^2,$$

and, $$\Delta X^{\frac{1}{3}} = 0, \Delta Y^{\frac{1}{3}} = 0 \text{ and } \Delta Z^{\frac{1}{3}} = 0$$

if $\Delta E_x^2 > \beta$ wherein $\beta$ is a constant. Since $\Delta E_x^2$ is dependent on the change of the input image, the re-digitization is conducted preferably according to the image change if it is abrupt, exceeding a constant $\beta$.

Also, as in the foregoing embodiment, the value $\beta$ is preferably according to the image, larger for a continuous-tone image and smaller for a screen-toned or character image. Furthermore said value may be automatically regulated, adaptively according to the microscopic features, for example edge information, of the input image.

Furthermore, said $\Delta E_x^2$ is defined by the difference between the error-corrected input image signal and the anticipated average value, but the change in the input image can be more effectively reflected on the result by applying the above-explained error correction to a newly defined difference $\delta E^2$ with respect to the input image signal f before error correction, in the following manner:

$$\delta E_x^3 = (X_f^{\frac{1}{3}} - mX_x^{\frac{1}{3}})^2 + (Y_f^{\frac{1}{3}} - mY_x^{\frac{1}{3}})^2 + (Z_f^{\frac{1}{3}} - mZ_x^{\frac{1}{3}})^2,$$

$$\Delta X^{\frac{1}{3}} = 0, \Delta Y^{\frac{1}{3}} = 0, \Delta Z^{\frac{1}{3}} = 0 \text{ if } E_x^e > \beta$$

wherein $\beta$ is a constant.

Furthermore, the foregoing fifth embodiment is to effect re-digitization into eight representative colors of C, M, Y, R, G, B, K and W based on binary recording four colors C, M, Y and K, but more faithful black color reproduction can be attained by re-digitization with eleven colors additionally including:

$$CK = C + K, MK = M + K \text{ and } YK = Y + K.$$

In this case the conversion to the record signals is conducted by C=1, K=1 for CK; M=1, K=1 for MK, and Y=1, K=1 for YK. In this process, in an area close to black, the recording dots are less frequently recorded in a single color but can be re-digitized in dark gray with more faithful hue.

Also for more faithful re-digitization of light gray in case of ink jet recording with inks of different densities or electrophotographic recording with pulse width energy modulation, there may be employed three-level black recording with an intermediate level WK=0.5K, achievable with the same L*a*b* values employing black ink of lower density for the former recording or with a half dot size in the latter recording, and the re-digitization may be conducted with nine colors including such intermediate black level, in addition to the foregoing eight colors.

This method may be further expanded to C, M and Y to obtain re-digitized image of improved quality, through the increase in intermediate record/representation colors.

Also, in said fifth embodiment, a representation color x of an anticipated average value having the shortest distance to the input image signal in the $(X)^{\frac{1}{3}}(Y)^{\frac{1}{3}}(Z)^{\frac{1}{3}}$ space is selected as the re-digitized value, but it is also possible to employ $\Delta E_x^2$ in the L*a*b* space thereby obtaining uniform color differences in the re-digitization error. More specifically, the anticipated average values are transformed into the L*a*b* space in the following manner:

$$mL_x^* = 116 mY_x^{\frac{1}{3}} - 16,$$

$$ma_x^* = 500 (mX_x^{\frac{1}{3}} - mY_x^{\frac{1}{3}}),$$

$$mb_x^* = 200 (mY_x^{\frac{1}{3}} - mZ_x^{\frac{1}{3}}),$$

and $\Delta E_x^2$ is determined from the values $L_f^*$, $a_f^*$ and $b_f^*$ obtained by transformation of the error-corrected input image signal f' into the L*a*b* space, in the following manner:

$$\begin{aligned}\Delta E_x^2 &= (L_f^* - mL_x^*)^2 + (a_f^* - ma_x^*)^2 + (b_f^* - mb_x^*)^2 \\ &= 116^2(\Delta Y^{\frac{1}{3}})^2 + 500^2(\Delta X^{\frac{1}{3}} - \Delta Y^{\frac{1}{3}})^2 + \\ &\quad 200^2(\Delta Y^{\frac{1}{3}} - \Delta Z^{\frac{1}{3}})^2,\end{aligned}$$

and a representation color x showing the minimum value is determined as the re-digitized value $X_{ij}$ of the object pixel as follows:

$$X_{ij} = min(\Delta E_x^2).$$

The error correction is naturally conducted in the $(X)^{\frac{1}{3}}(Y)^{\frac{1}{3}}(Z)^{\frac{1}{3}}$ spaces.

The fifth embodiment employs four pixels for reference, but this number is not limitative. Particularly when a weighting coefficient sixteen is allotted to the object pixel position, a similarly satisfactory pseudo halftone processing is possible by expanding the above-mentioned reference area to 4–8 pixels.

As explained in the foregoing, the fifth embodiment enables re-digitization faithful to the input image signal by determining the average values in the $X^{\frac{1}{3}}Y^{\frac{1}{3}}Z^{\frac{1}{3}}$ space based on the already re-digitized data and the anticipated re-digitization of the object pixel, determining the differences between said average values and the input image signals, selecting a recording color of the smallest difference thereby obtaining a record color for each pixel, and adaptively controlling the distribution of the re-digitization error to the neighboring pixels.

Also, the fifth embodiment, being capable of reproducing colors faithful to those of the original image, can reproduce fine-lined black characters in sharper black color, in comparison with the pseudo-halftone-processed image obtained by four-color separation.

As explained in the foregoing, the fifth embodiment effects halftone processing of the input image data in a color space represented by $X^{\frac{1}{3}}Y^{\frac{1}{3}}z^{\frac{1}{3}}$, thereby reproducing hues faithful to those of the input color image, and also effects correction on the error in the conversion to the representation color, thereby providing an image of high quality.

Sixth Embodiment

In the following there will be explained a sixth embodiment for conducting digitization by correcting the input data according to the recording characteristics of the recording device.

Figure 22:
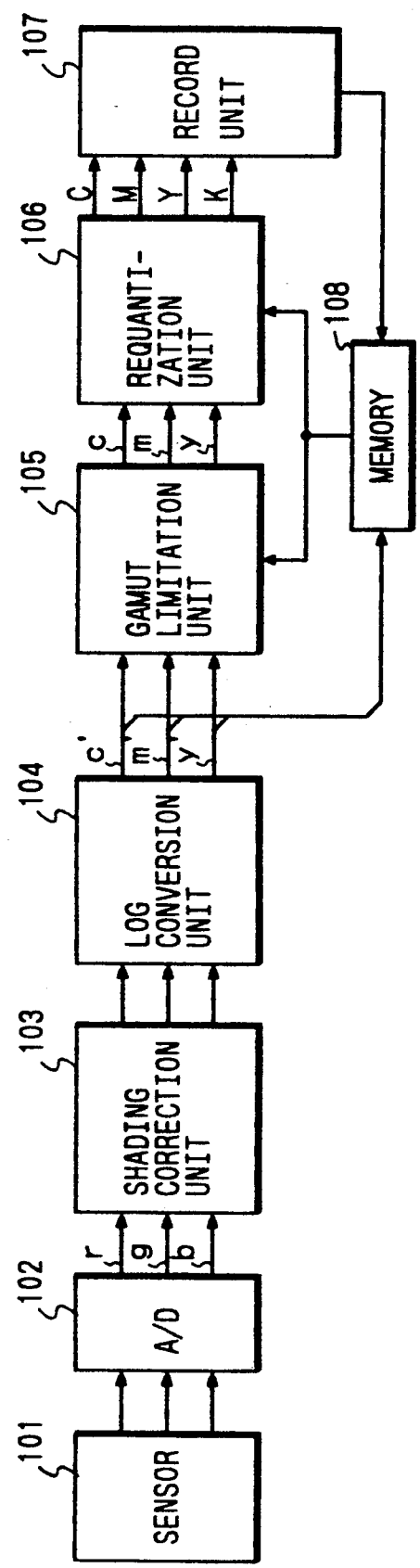
FIG. 22 is a schematic block diagram of an image processing apparatus constituting a sixth embodiment.

FIG. 22 is a schematic block diagram of an image processing apparatus of the present embodiment. Analog image signals, separated into R, G and B colors in a CCD 101, are respectively digitized into 8-bit digital signals in an A/D converter 102, then subjected to the correction of unevenness and filtering characteristics of the sensor 101 and an unrepresented imaging system by a shading correction unit 103, then converted into so-called NTSC r, g, b luminosity data, and further converted into density data c', m', y' in a logarithmic conversion unit 104. In case of reading the recording characteristics, a memory 108 stores recording colors usable for recording each dot in a recording device 107 to be explained later, for example 8 colors red (R), green (G), blue (B), cyan (C); magenta (M), yellow (Y), black (K) and white (W), in the form of logarithmically converted r, g, b data. If such data are already available in the recording device 107, they may be entered from the recording device 107 to the memory 108.

The density data, converted according to the above-mentioned recording characteristic data, are limited, in a Gamut limitation unit 105, to a color reproduction area. The c, m, y data subjected to said Gamut limitation are supplied to a re-digitization unit 106, and, for each point of input image data, a record color closest to the hue of the input image is selected from eight available record colors. From the thus-selected color, the C, M, Y and K colors of one bit each are decoded and recorded on the recording device 107.

In the following explained are the details of the re-digitization unit 106 mentioned above with reference to FIG. 23. In this circuit, 3-bit data digitized in the selective re-digitization unit 106 are decoded into 1-bit C, M, Y data in a record signal conversion unit 1064, and an average calculation unit 1061 determines a weighted average value in the vicinity of the object pixel, based on 1-bit c, m, y data. The relationship among these data are given in FIG. 24.

There are obtained eight weighted average values, corresponding to the eight anticipated re-digitizations of the object pixel. Thus the selective re-digitization unit 1062 completes the re-digitization by selecting an anticipated value closest to the input data. At the same time, the difference or re-digitization error between the selected anticipated average value and the input data is determined in each of the c, m, y spaces, and is corrected in an error correction unit 1063. The above-mentioned weighted average values are calculated by replacing the plural data, obtained by re-digitization in eight manners, with c, m, y multi-value data in the actual recording device 107, obtained from the memory 108.

Figure 25:
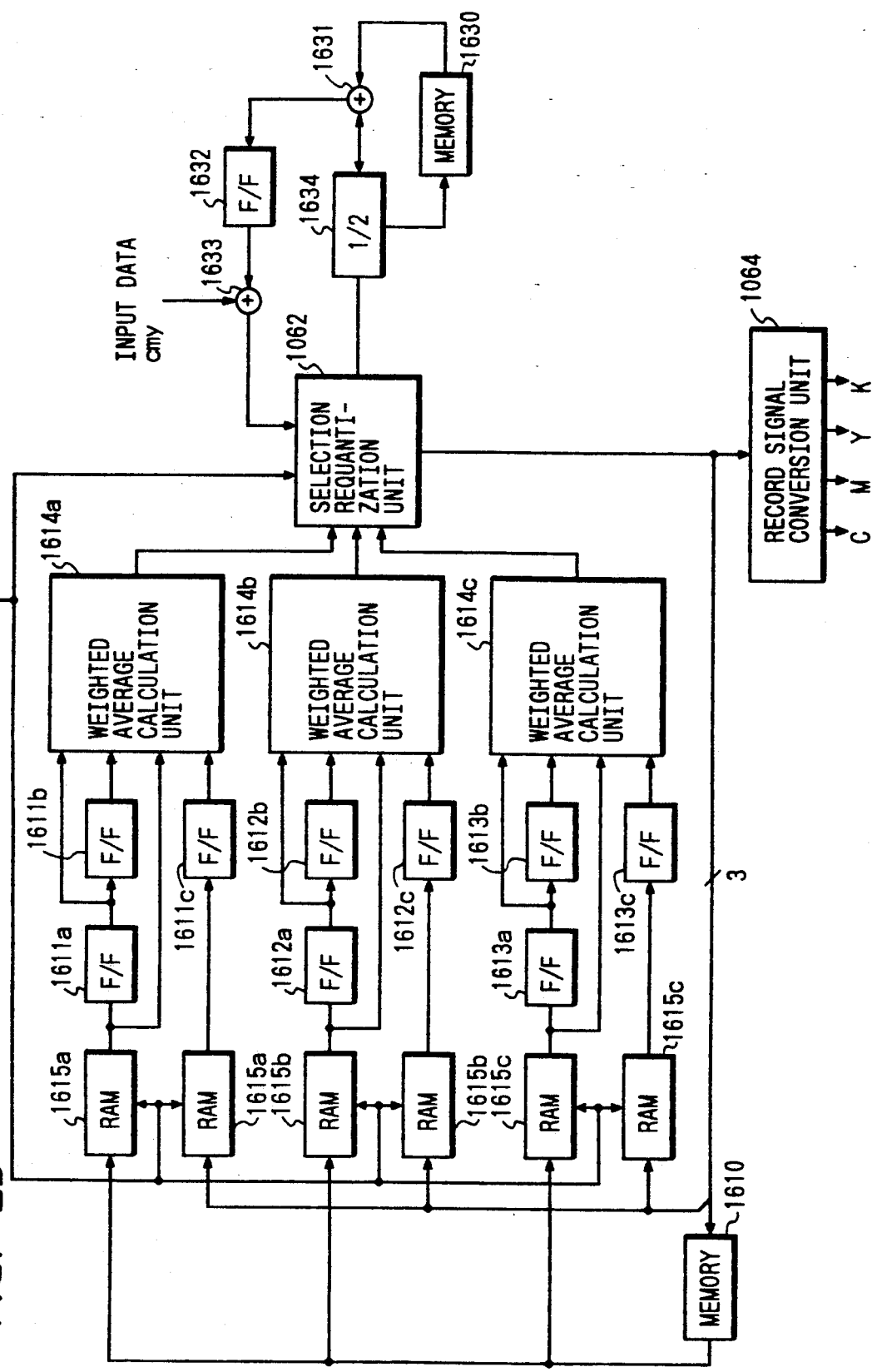
FIG. 25 is a blck diagram of a re-digitizing unit in said sixth embodiment.

Now reference is made to FIG. 25 for further detailed explanation. A FIFO (first-in-first-out) memory 1610 for delaying re-digitized 3-bit image data by a line period, is connected, at the input and output terminals thereof, to independent weighted average calculations units 1614a–c for c, m and y colors. Thus the re-digitized data are converted into c, m, y multi-value data as the actual colors to be used in the recording device 107 by means of RAM's 1615a–c, then further delayed for several pixels by F/F's 1611a–c for example in case of cyan color, and weighted average values are obtained by the weighted average calculation units 1614a–c, based on the re-digitized data of four pixels adjacent to the object pixel. The recording characteristics employed in the present embodiment are shown in FIG. 26.

The weighting coefficients for determining the average value in the object pixel * and adjacent pixels A–D shown in FIG. 5 are selected as 1/16–6/16 as shown in FIG. 21. In the case of cyan color, the output of F/F 1611c, input and output of F/F 1611a, and output of F/F 1611b shown in FIG. 25 respectively correspond to the positions A, B, C and D. Thus the weighted average calculation unit 1614a executes multiplication-summation employing the weighting coefficients shown in FIG. 21, thereby obtain eight average values with anticipated re-digitization of the object pixel in 8 manners.

For example, if the pixels A, B, C and D are re-digitized as cyan, white, yellow and white, the recording characteristics shown in FIG. 26 become those shown in FIG. 27, and the weighted average calculation units 1614a–c provide the average values $m_c$, $m_m$, $m_y$ of four pixels in the following manner:

$$m_c = (4 \times 206 + 1 \times 15 + 4 \times 19 + 1 \times 15) \times 1/16 = 58,$$

$$m_m = (4 \times 91 + 1 \times 15 + 4 \times 16 + 1 \times 15) \times 1/16 = 29,$$

$$m_y = (4 \times 37 + 1 \times 15 + 4 \times 196 + 1 \times 15) \times 1/16 = 105.$$

Then the selective re-digitization unit 1062 determines 8 sets of anticipated average values $M_c$, $M_m$, $M_y$ shown in FIG. 28, based on the above-mentioned average values $m_c$, $m_m$, $m_y$ and the weighting coefficient 6/16 for the object pixel.

As an example, if the object pixel is anticipated as cyan, there are obtained following results from the data of FIG. 26, and anticipated data in FIG. 28 are similarly obtained:

$$M_c = m_c + 206 \times 6/16 = 135,$$

$$M_m m_m + 91 \times 6/16 = 63,$$

$$M_y = m_6 + 37 \times 6/16 = 119.$$

The selective re-digitization unit 1062 effects comparison of the input data (more precisely error-corrected input data) with eight sets of data shown in FIG. 25, by determining the distance $\Delta d$ between the eight sets of anticipated average values and the input data $I_c$, $I_m$, $I_y$ in the following manner, and determines a re-digitized color providing the minimum distance $$\Delta d = (I_c - M_c)^2 + (I_m - M_m)^2 + (I_y - M_y)^2.$$

For example if $I_c = 81$, $I_m = 100$ and $I_y = 140$, said distance apparently becomes minimum for magenta color, so that the object pixel is re-digitized as magenta.

The anticipated average values for magenta are different from the input data by differences $E_c$, $E_m$, $E_y$, which are supplied as re-digitization errors to a distributor 1634. Said errors are represented as follows in the above-mentioned example:

$$E_c = 81 - 79 = 2,$$

$$E_m = 100 - 112 = -2,$$

$$E_y = 140 - 134 = 6.$$

Said re-digitization errors are divided by a distributor 1634 into two parts, of which one is delayed for a line period in a line delay memory 1630, while the other is added in an adder 1631 to an error of the preceding line read from said memory 1630, and is synchronized with the next input data in an F/F 1632, thereby correcting the next pixel data. The above-mentioned error correction unit 1063 effects the above-mentioned processing independently for cyan magenta and yellow colors.

The re-digitization of the entire image data is completed by the above-explained process for each of the input pixel data.

Figure 29:
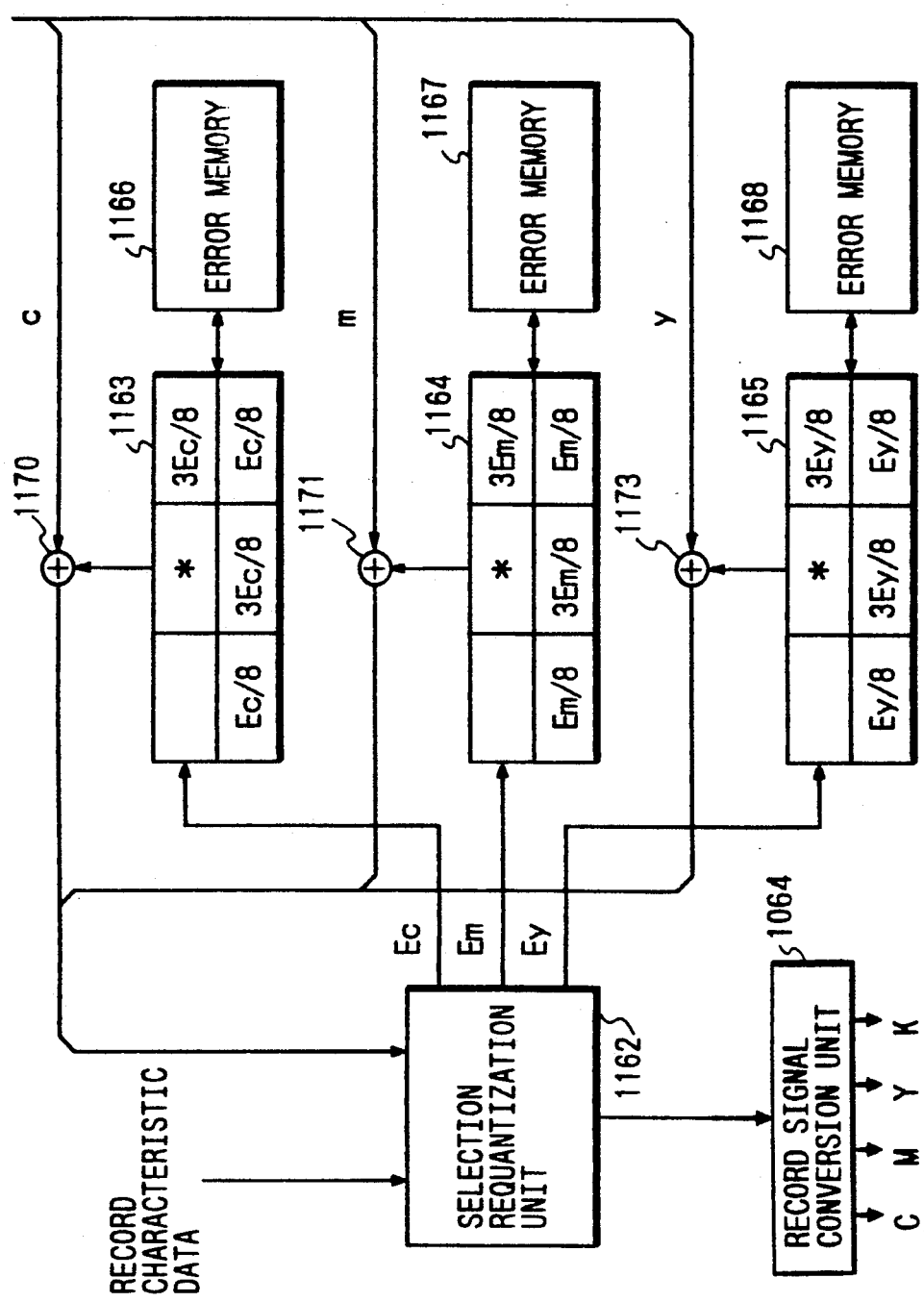
FIG. 29 is a block diagram of the re-digitizing unit when the error diffusion method is employed in the sixth embodiment.

In the following there will be explained the re-digitization unit 106 based on the error diffusion method, with reference to FIG. 29.

A selective re-digitization unit 1162 receives the c, m, y input data after correction of the re-digitization error, and selects, among eight sets of recording characteristic data shown in FIG. 26, supplied from a memory 108 shown in FIG. 22, a set showing smallest distance to the input data. In the above-mentioned example of input data if $I_c=81$, $I_m=100$ and $I_y=140$, if the object pixel is anticipated as cyan color, said distance $\Delta d$ is given by:

$$\Delta d = (206 - 81)^2 + (91 - 100)^2 + (37 - 140)^2$$
$$= 26315.$$

Comparison is made with seven other anticipated cases, and the red color is identified to have the smallest distance. The result of re-digitization is decoded in a record signal conversion unit 1064, and is supplied to the recording device in the form of binary C, M, Y, K data as in the foregoing embodiment.

On the other hand, the re-digitization errors:

$$E_c = 81 - 60 = 21,$$

$$E_m = 100 - 219 = -119,$$

$$E_y = 140 - 190 = -50,$$

are supplied to error distribution units 1163-1165 which distribute and store said errors with illustrated ratios for the adjacent pixels, in respective error memories 1166-1168.

The input image data of next pixel are corrected by thus distributed errors and errors distributed in the past, read from the memories and added in adders 1170-1173.

The above-explained process is conducted for each pixel, thereby achieving re-digitization with faithful color reproduction to the input image, as in the foregoing embodiments.

In the above-explained process, if the input image data exceeds the color reproduction area based on the recording characteristics, for example if data $I_c=I_m=I_y=255$ are entered in consecutively manner, the generated re-digitization error becomes always positive, since the anticipated average value is always smaller than said data. Consequently the re-digitization error continues to increase so that the process eventually becomes dispersing. Thus the Gamut limitation unit 105 of the present embodiment is provided to prevent such process dispersion.

Figures 30, 31:
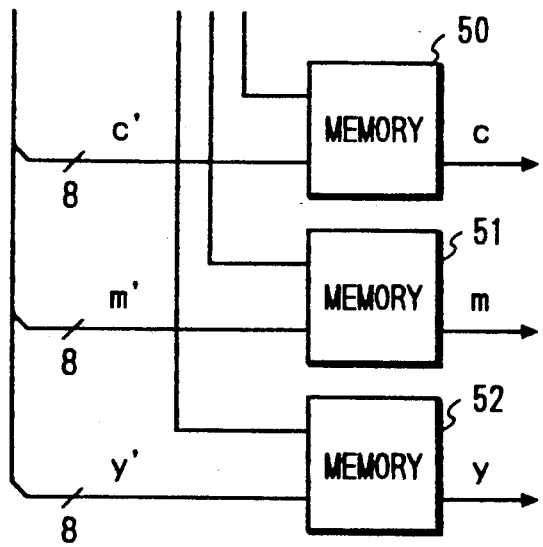
FIG. 30 is a block diagram of a Gamut limiting unit in the sixth embodiment.
FIG. 31 is a chart of an example employing plural black recording materials.

FIG. 30 is a block diagram of the Gamut limitation unit 105 in the present embodiment. RAM's 50-52 constitute a look-up table (LUT) prepared in advance according to the recording characteristics (FIG. 20), for data conversion in the following manner, in case of cyan color:

$$C = C_{max} \text{ for } C' \geq C_{max},$$

$$C = C_{min} \text{ for } C' \leq C_{min},$$

$$C = C' \text{ in other cases.}$$

wherein $C_{max}$ and $C_{min}$ are respectively the maximum value 210 and the minimum value 15 for cyan data in FIG. 20. Similar principles are applicable to magenta and yellow data.

In the foregoing embodiment, the data exceeding the reproducible color space are clamped by $C_{max}$ and $C_{min}$, but it is also possible to transform the input data 0-255 into the range $C_{min}$-$C_{max}$ in the following manner:

$$C = C_{min} + (C_{max} - C_{min})/255 \times C'.$$

Also non-linear conversions with following algorithms can be easily achievable by the circuit shown in FIG. 30:

$$C = f(C_{min}, C_{max}, C').$$

Though the above-explained process is conducted independently for each color, a more precise process can be conducted by detecting a point positioned outside of a body defined by eight points, corresponding to eight sets of data in FIG. 26, in a three-dimensional c, m, y space and determining a point on the closest surface of said body. Such process can be realized by employing a RAM receiving c', m', y' data at the address ports and effecting conversion by a look-up table in said RAM.

As explained in the foregoing, the present embodiment can achieve easily to the adaptation in the characteristic change in the recording device, by re-digitization with error correction based on hue data recorded by the actual recording device 107. For example, binary re-digitization can be realized by employing six colors obtained by the combinations of cyan, magenta and yellow, and black and white which is in this case the hue data of the recording sheet, recording these colors as color patterns, reading the data of these colors and storing then in the data memory 108.

In the above-explained embodiment there are employed recording characteristic data with the single black recording material for black recording, but the color reproduction may be improved by the use of re-digitization of 11 colors including three sets of color data for $K_c$ consisting of K and C, $K_m$ consisting of K and M, and $K_y$ consisting of K and Y. A further improvement in the color reproduction can be achieved by re-digitization with twelve colors, through the addition of black data $K_{cmy}$ consisting of C, M and Y. In such case the decoding to the record signals is conducted according to FIG. 31.

The above-explained embodiment is designed for binary re-digitization, but is also applicable to a case in which the recording in each color is achievable in 3-16 levels. For example, the embodiment shown in FIG. 25 can be expanded to three levels by changing the sum of the weighting coefficients for average calculation from 1 to ½, selecting the re-digitization level from 0, 1 and 2 for each color, thereby providing 27 combinations, and selecting the object pixel from 27 anticipated levels. Such increase in the number of levels of re-digitization decreases the re-digitization error, thereby enabling re-digitization faithful to the input image.

The present invention may be applied to a system consisting of plural devices, or to an apparatus consisting solely of a device. Also, it is applicable to a case in which a program is combined with a system or an apparatus.

As explained in the foregoing, the sixth embodiment:

(1) effects re-digitization with the actual color data reproducible by the recording device, thereby achieving re-digitization faithful to the input image;

(2) effects re-digitization directly with the characteristics of the recording device, thereby achieving re-digitization faithful to the input image even in the presence of fluctuation in the characteristics of the recording device; and (3) controls the input image data according to the color characteristics reproducible in the recording device, thereby preventing the dispersion of the re-digitizing process.

The present invention has been explained by the preferred embodiments thereof, but it is not limited by such embodiments and is subject to various modifications within the scope and spirit of the appended claims.

What is claimed is:

1. A color image processing apparatus comprising:
    first input means for entering a color image in the form of color coordinate data represented by luminosity and hue;
    second input means for entering representation colors of N kinds to be used in the recording or display, in the form of said color coordinate data;
    process means for converting the color coordinate data entered by said first input means into one of said representation colors of N kinds; and
    correction means for correcting an error generated at said conversion.

2. An apparatus according to claim 1, wherein said first input means receives, as the color coordinate data, $L^*a^*b^*$ data or $X^{\frac{1}{3}}Y^{\frac{1}{3}}Z^{\frac{1}{3}}$ data.

3. An apparatus according to claim 2, wherein said second input means receives eight representation colors, which are cyan, magenta, yellow, black, red, green, blue and white, in the form of $L^*a^*b^*$ or $X^{\frac{1}{3}}Y^{\frac{1}{3}}Z^{\frac{1}{3}}$ data.

4. An apparatus according to claim 3, wherein said process means is adapted to convert the $L^*a^*b^*$ or $X^{\frac{1}{3}}Y^{\frac{1}{3}}Z^{\frac{1}{3}}$ data, entered by said first input means, into data of one of said eight colors.

5. An apparatus according to claim 4, further comprising means for converting data, converted into one of the representation colors of N kinds by said process means, into data for recording or display.

6. An apparatus according to claim 1, wherein said process means is adapted to calculate an average value on the color coordinate data, based on already converted data in the vicinity of an object pixel, and convert the color image entered by the first input means to a representation color closest to said average value.

7. An apparatus according to claim 1, wherein said correction means is adapted to correct all the error when it is smaller than a predetermined value, and corrects a predetermined amount of the error when it is larger than said predetermined value.

8. A color image processing apparatus comprising:
    means for determining plural average values in a color space represented by luminosity and hue, based on already digitized data in the vicinity of an object pixel and anticipated digitized values of the object pixel;
    means for determining respective differences between (1) the input image signal and (2) respective ones of said plural anticipated average values;
    digitization means for selecting the anticipated digitized value giving the smallest one of said respective differences as the digitized value of the object pixel; and
    conversion means for converting the digitized signal into a record or display signal.

9. An apparatus according to claim 8, further comprising correction means for correcting an error in said respective difference between the anticipated average value selected by said digitization means and the input image signal, which error is generated in digitization of the input image signal of the object pixel by said digitization means.

10. An apparatus according to claim 9, wherein said correction means is adapted to correct the error up to a predetermined value if said error is larger than a predetermined value.

11. An apparatus according to claim 8, wherein said average value calculating means is adapted to determine the average value in the $L^*a^*b^*$ space.

12. An apparatus according to claim 8, wherein said digitization means is adapted to digitize the entered $L^*a^*b^*$ data into one of eight colors, which are yellow, magenta, cyan, black, red, green, blue and white.

13. A color image processing method comprising the steps of:
    calculating average values in a color space represented by luminosity and hue, based on plural data already digitized to data of one of plural colors in the vicinity of an object pixel and anticipated digitized values of said object pixel; and
    digitizing the data of said object pixel, represented by luminosity and hue, into data of one of said plural colors, based on said average values.

14. A method according to claim 13, further comprising the step of correcting an error generated in said digitizing step in the color space, wherein said correcting step is so performed as to correct the digitization error in an adaptive manner according to the magnitude of the digitization error.

15. A color image processing apparatus comprising:
    anticipated average value calculation means for calculating plural average values in a color space, based on plural data already digitized into one of plural colors, in the vicinity of an object pixel, and anticipated digitized values of said object pixel;
    digitization means for determining the closest color to the input image, among plural average values; and
    correction means for correcting the digitization error generated in said digitization.

16. An apparatus according to claim 15, wherein said color space is $L^*a^*b^*$ space.

17. An apparatus according to claim 15, wherein said color space is $X^{\frac{1}{3}}Y^{\frac{1}{3}}Z^{\frac{1}{3}}$ space.

18. A color image processing apparatus comprising:
    calculation means for determining plural weighted average values in anticipation of digitized values of an object pixel, according to the recording characteristics of a recording device; and
    digitization means for selecting, among the plural weighted average values determined by said calculation means, one closest to input color data, thereby digitizing the input color data into color data reproducible by a recording or displaying device.

19. An apparatus according to claim 18, further comprising correction means for correcting an error generated in digitization of the input color data by said digitization means.

20. A color image processing apparatus comprising:
first input means for entering a color image in the form of color coordinate data consisting of of a plurality of color components;
second input means for entering representation colors of N kinds to be used in the recording or display, in the form of the color coordinate data; and
process means for converting the color coordinate data entered by said first input means into one of said representation color of N kinds,
wherein said process means further comprises gamut limitation processing means.

21. An apparatus according to claim 20, further comprising correction means for correcting an error generated upon operation by said processing means.

22. An apparatus according to claim 20, wherein said first input means receives, as the color coordinate data, $L^*a^*b^*$ or $X^{\frac{1}{3}}Y^{\frac{1}{3}}Z^{\frac{1}{3}}$ data.

23. An apparatus according to claim 22, wherein said second input means receives eight representation colors, which are cyan, magenta, yellow, black, red, green blue and white, in the form of $L^*a^*b^*$ or $X^{\frac{1}{3}}Y^{\frac{1}{3}}Z^{\frac{1}{3}}$ data.

24. An apparatus according to claim 23, wherein said process means is adapted to convert the $L^*a^*b$ or $X^{\frac{1}{3}}Y^{\frac{1}{3}}Z^{\frac{1}{3}}$ data, entered by said first input means, into data of one of said eight colors.

25. An apparatus according to claim 24, further comprising means for converting data, converted into one of the representation colors of N kinds by said process means, into data for recording or display.

26. An apparatus according to claim 20, wherein said process means is adapted to calculate an average value on the color coordinate data, based on already converted data in the vicinity of an object pixel, and to convert the color image entered by said first input means to a representation color closest to said average value.

27. A color image processing apparatus comprising:
first input means for entering a color image in the form of color coordinate data consisting of of a plurality of color components;
second input means for entering representation colors of N kinds to be used in the recording or display, in the form of the color coordinate data;
process means for converting the color coordinate data entered by said first input means into one of said representation color of N kinds; and
correction means for correcting the color image entered by said first input means, in accordance with a recording characteristic of recording means.

* * * * *

UNITED STATES PATENT AND TRADEMARK OFFICE
CERTIFICATE OF CORRECTION

PATENT NO. : 5,270,808
DATED : December 14, 1993
INVENTOR(S) : HIROSHI TANIOKA, ET AL.

It is certified that error appears in the above-identified patent and that said Letters Patent is hereby corrected as shown below:

IN THE DRAWINGS

Figure 23:
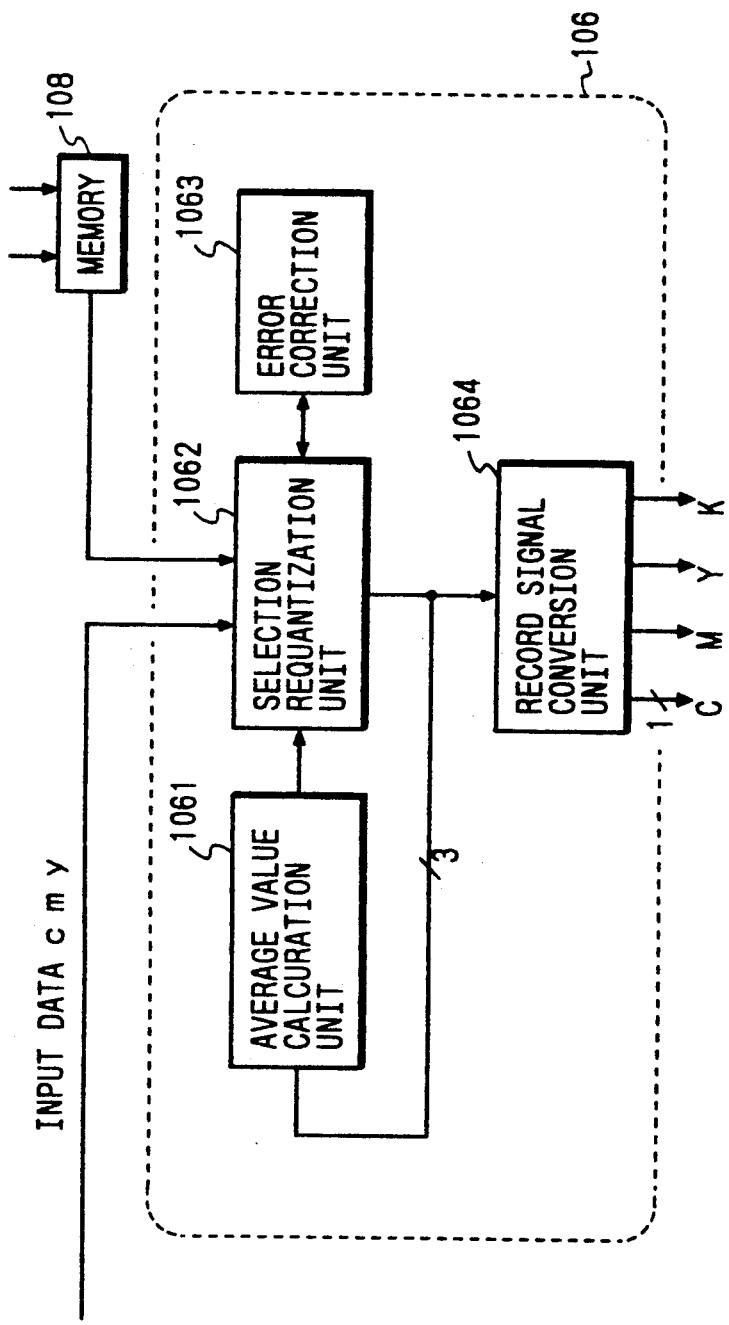
FIG. 23 is a block diagram of a re-digitizing unit in said sixth embodiment.

Sheet 16 of 21, FIG. 23, "CALCURATION" should read --CALCULATION--.

COLUMN 1

Line 10, "Aug. 2, 1992" should read --Aug. 2, 1991--.
    Line 23, "pseudo halftone" should read --pseudo-halftone--.
    Line 37, "pseudo halftone" should read --pseudo-halftone--.
    Line 39, "However" should read --However,-- and "pseudo halftone" should read --pseudo-halftone--.
    Line 48, "ticularly" should read --ticularly,--.

COLUMN 2

Line 55, "he" should read --the--.

COLUMN 3

Line 11, "diagram" should read --diagrams--.
    Line 13, "blk" should read --block--.
    Line 39, "blck" should read --block--.
    Line 65, "scheatic" should read --schematic--.

COLUMN 4

Line 6, "Digital" should read --The digital--.
    Line 7, "the" (first occurrence) should be deleted.
    Line 18, "featuring" should read --featured--.
    Line 20, "pseudo" should read --pseudo- --.
    Line 23, "produdible" should read --productible--.
    Line 27, "pseudo halftone" should read --pseudo-halftone--.

UNITED STATES PATENT AND TRADEMARK OFFICE
CERTIFICATE OF CORRECTION

PATENT NO. : 5,270,808

DATED : December 14, 1993

INVENTOR(S) : HIROSHI TANIOKA, ET AL.

It is certified that error appears in the above-identified patent and that said Letters Patent is hereby corrected as shown below:

COLUMN 5

Line 3, "8 colors)" should read --eight colors)--.
Line 21, "shon" should read --shown--.
Line 38, "LD*, aD* and bD*" should read --$L_D^*$, $a_D^*$ and $b_D^*$--.
Line 53, "following" should read --the following--.
Line 59, "mg" should read --mb--.
Line 68, "mg" should read --mb--.

COLUMN 6

Line 6, close up right margin.
Line 7, close up left margin.
Line 9, "distance E" should read --distance $\Delta E$--.
Line 15, "mg" should read --mb--.
Line 50, "Bata" should read --B data--.
Line 56, "pseudo halftone" should read --pseudo-halftone--.
Line 65, "pseudo" should read --pseudo- --.

COLUMN 7

Line 5, "1st" should read --first--.
Line 7, "calcualtes" should read --calculates--.
Line 8, "1st" should read --first--.
Line 19, "$\Delta Aa^*$," should read --$\Delta a^*$,--.
Line 25, "mL" should read --mb--.
Line 34, "e2(i+1j)" should read --e2(i+1, j)--.
Line 48, "(i,j) e2(i,j)" should read --(i,j)+e2(i,j)--.

UNITED STATES PATENT AND TRADEMARK OFFICE
CERTIFICATE OF CORRECTION

PATENT NO. : 5,270,808
DATED : December 14, 1993
INVENTOR(S) : HIROSHI TANIOKA, ET AL.

Page 3 of 7

It is certified that error appears in the above-identified patent and that said Letters Patent is hereby corrected as shown below:

COLUMN 8

Line 12, "$\Delta E_r,$" should read --$\Delta E_R,$--.
Line 19, "$\Delta AL*,$" should read --$\Delta L*,$--.
Line 20, "$\Delta Ab*$" should read --$\Delta b*$--.
Line 28, "districuted" should read --distributed--.
Line 45, "pseudo halftone" should read --pseudo-halftone--.
Line 65, "luminocity" should read --luminosity--.

COLUMN 9

Line 42, "thus" should read --the thus--.

COLUMN 10

Line 2, "utput" should read --output--.
Line 13, "$mL*=1 \times L*_D 4 \times L*_C 1 \times L*_B 4 \times L*_A$" should read
   --$mL*=1 \times L*_D + 4 \times L*_C + 1 \times L*_B + 4 \times L*_A$--.
Line 15, "$ma*=1 \times a*_D 4 \times a*_C 1 \times a*_B 4 \times a*_A$" should read
   --$ma*=1 \times a*_D + 4 \times a*_C + 1 \times a*_B + 4 \times a*_A$--.
Line 17, "$mb*=1 \times b*_D 4 \times b*_C 1 \times b*_B 4 \times b*_A$" should read
   --$mb*=1 \times b*_D + 4 \times b*_C + 1 \times b*_B + 4 \times b*_A$--.
Line 25, "$mg*_0$" should read --$mb*_0$--.
Line 29, "$ma*_0=(mb*$" should read --$ma*_0=(ma*$--.
Line 38, "$ma*_x=(mL*+6 \times L*_x) \times 1/16,$" should read
   --$ma*_x=(ma*+6 \times a*_x) \times 1/16,$--.
Line 40, "$mb*_x=(mL*+6 \times L*_x) \times 1/16,$" should read
   --$mb*_x=(mb*+6 \times b*_x) \times 1/16,$--.
Line 43, "representable eight" should read --eight representable--.
Line 52, "$-maI_x)^2+(b*_f-mb*_x)^2$" should read
   --$ma*_x)^2+(b_f^1-mb*_x)^2$--.
Line 59, "correlated" should read --are correlated--.

UNITED STATES PATENT AND TRADEMARK OFFICE
CERTIFICATE OF CORRECTION

PATENT NO. : 5,270,808
DATED : December 14, 1993
INVENTOR(S) : HIROSHI TANIOKA, ET AL.

It is certified that error appears in the above-identified patent and that said Letters Patent is hereby corrected as shown below:

COLUMN 11

Line 16, "the blurring" should read --blurring--.
Line 26, "$\Delta Aa^*, \Delta Ab^*$" should read --$\Delta a^*, \Delta b^*$--.
Line 31, "e2(i,j+1)" should read --e2(i+1,j)--.
Line 40, "(i,j-1)" should read --(i,j+1)--.
Line 65, "same" should read --the same--.

COLUMN 12

Line 16, "pseudo.random" should read --pseudo-random--.
Line 24, "eor" should read --error--.
Line 35, "$\alpha_L$" should read --$\beta_L$--.
Line 46, "$\Delta Aa^*,$" should read --$\Delta a^*,$--.
Line 50, "y" should read --by--.
Line 61, "4th" should read --fourth--.

COLUMN 13

Line 11, "11" should read --eleven--.
Line 16, "M=1 K=1" should read --M=1, K=1--.
Line 28, "colors" should read --colors,--.
Line 55, "embodiment," should read --embodiments,--.
Line 56, "pseudo halftone" should read --pseudo-halftone--.
Line 61, "be" should read --is--.

COLUMN 14

Line 17, "$(X)^{\frac{1}{2}}(Y)1 (Z)^{\frac{1}{2}}$" should read --$(X)^{\frac{1}{2}}(Y)^{\frac{1}{2}}(Z)^{\frac{1}{2}}$-- and "A-error" should read --An error--.
Line 22, "thus error-corrected" should read --thus-error-corrected--.

UNITED STATES PATENT AND TRADEMARK OFFICE
CERTIFICATE OF CORRECTION

PATENT NO. : 5,270,808

DATED : December 14, 1993

INVENTOR(S) : HIROSHI TANIOKA, ET AL.

It is certified that error appears in the above-identified patent and that said Letters Patent is hereby corrected as shown below:

COLUMN 14

Line 39, "$(Y)^{\frac{1}{2}}$" should read --$(X)^{\frac{1}{2}}$--.
Line 41, "$(X)^{\frac{1}{2}}$" should read --$(Y)^{\frac{1}{2}}$--.
Line 49, "$Z(^{\Delta}data.$" should read --$(Z)^{\frac{1}{2}}data.$--.
Line 66, "$(Y)_c^{\frac{1}{2}}$" should read --$(Y)_D^{\frac{1}{2}}$--.
Line 68, "$(A)^{\frac{1}{2}}, (Z)_z^{\frac{1}{2}},$" should read --$(Z)^{\frac{1}{2}}data\ (Z)_A^{\frac{1}{2}},$--.

COLUMN 15

Line 9, "$mX_0^{\frac{1}{2}}=(mX^{\frac{1}{2}}+6\times Y_0^{\frac{1}{2}})\times 1/16,$" should read
--$mX_0^{\frac{1}{2}}=(mX^{\frac{1}{2}}+6\times X_0^{\frac{1}{2}})\times 1/16,$--.
Line 13, "$mZ_0^{\frac{1}{2}}=(mZ^{\frac{1}{2}}+6\times Y_0^{\frac{1}{2}})\times 1/16.$" should read
--$mZ_0^{\frac{1}{2}}=(mZ^{\frac{1}{2}}+6\times Z_0^{\frac{1}{2}})\times 1/16.$--.
Line 17, "$mX_x^{\frac{1}{2}}=(mX^{\frac{1}{2}}+6\times Y_x^{\frac{1}{2}})\times 1/16,$" should read
--$mX_x^{\frac{1}{2}}=(mX^{\frac{1}{2}}+6\times X_x^{\frac{1}{2}})\times 1/16,$--.
Line 21, "$mZ_x^{\frac{1}{2}}=(mZ^{\frac{1}{2}}+6\times Y_x^{\frac{1}{2}})\times 1/16.$" should read
--$mZ_x^{\frac{1}{2}}=(mZ^{\frac{1}{2}}+6\times Z_x^{\frac{1}{2}})\times 1/16.$--.
Line 34, "$X_{ij}=min(E_x^2).$" should read --$X_{ij}=min(\Delta E_x^2).$--.
Line 41, "erros" should read --errors--.
Line 46, "$\Delta Y^{\frac{1}{2}}=X_f^{\frac{1}{2}}-mY_x^{\frac{1}{2}},$" should read --$\Delta Y^{\frac{1}{2}}=Y_f^{\frac{1}{2}}-mY_x^{\frac{1}{2}},$--.
Line 48, "$\Delta Z^{\frac{1}{2}}=X_f^{\frac{1}{2}}-mZ_x^{\frac{1}{2}}.$" should read --$\Delta Z^{\frac{1}{2}}=Z_f^{\frac{1}{2}}-mZ_x^{\frac{1}{2}}.$--.
Line 52, "error. The" should read --error. ¶ The--.
Line 60, "$|\Delta X^{\frac{1}{2}}|>\alpha_Y,$" should read --$|\Delta Y^{\frac{1}{2}}|>\alpha_Y,$--.
Line 62, "$|\Delta X^{\frac{1}{2}}|>\alpha_z,$" should read --$|\Delta Z^{\frac{1}{2}}|>\alpha_z,$--.

COLUMN 16

Line 42, "embodiment. In" should read --embodiment. ¶ In--.
Line 48, "same" should read --the same--.

UNITED STATES PATENT AND TRADEMARK OFFICE
CERTIFICATE OF CORRECTION

PATENT NO. : 5,270,808
DATED : December 14, 1993
INVENTOR(S) : HIROSHI TANIOKA, ET AL.

It is certified that error appears in the above-identified patent and that said Letters Patent is hereby corrected as shown below:

COLUMN 17

Line 3, "embodiment" should read --embodiment,--.
Line 6, "imae" should read --image--.
Line 25, "Furthermore" should read --Furthermore,--.
Line 38, "$\delta E_x^3$" should read --$\delta E_x^e$--.
Line 48, "colors" should read --colors,--.
Line 66, "colors" should read --colors,--.
Line 67, "level," should read --level--.

COLUMN 18

Line 40, "pseudo" should read --pseudo- --.
Line 42, "4-8 pixels." should read --four to eight pixels.--.
Line 60, "$X^½Y^½_Z^½$," should read --$X^½Y^½Z^½$,--.

COLUMN 19

Line 39, "relationship" should read --relationships--.

COLUMN 20

Line 12, "obtain" should read --obtaining--.
Line 13, "8" should read --eight--.
Line 31, "8" should read --eight--.
Line 36, "following" should read --the following--.
Line 42, "$M_m m_m + 91 \times 6/16 = 63$," should read --$M_m = m_m + 91 \times 6/16 = 63$,--.
Line 43, "$M_y = m_6 + 37 \times 6/16 = 119$." should read
   --$M_y = m_y + 37 \times 6/16 = 119$.--.
Line 51, "distance" should read --distance:--.
Line 66, "$E_m = 100 - 112 = -2$," should read --$E_m = 100 - 112 = -12$,--.

UNITED STATES PATENT AND TRADEMARK OFFICE
CERTIFICATE OF CORRECTION

PATENT NO. : 5,270,808
DATED : December 14, 1993
INVENTOR(S) : HIROSHI TANIOKA, ET AL.

It is certified that error appears in the above-identified patent and that said Letters Patent is hereby corrected as shown below:

COLUMN 22

Line 51, "11 colors" should read --eleven colors,--.
Line 66, close up right margin.
Line 67, close up left margin.

COLUMN 25

Line 10, "of of" should read --of--.
Line 17, "color" should read --colors--.

COLUMN 26

Line 18, "of of" should read --of--.
Line 25, "color" should read --colors--.

Signed and Sealed this

Thirtieth Day of August, 1994

Attest:

BRUCE LEHMAN

Attesting Officer

Commissioner of Patents and Trademarks